United States Patent
Iijima et al.

(10) Patent No.: US 6,489,370 B2
(45) Date of Patent: Dec. 3, 2002

(54) METHOD OF MANUFACTURING A SYNTHESIS GAS TO BE EMPLOYED FOR THE SYNTHESIS OF GASOLINE, KEROSENE AND GAS OIL

(75) Inventors: Masaki Iijima, Tokyo (JP); Kazuto Kobayashi, Tokyo (JP); Kazuhiro Morita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/764,379

(22) Filed: Jan. 19, 2001

(65) Prior Publication Data

US 2002/0016375 A1 Feb. 7, 2002

(30) Foreign Application Priority Data

May 30, 2000 (JP) ........................................ 2000-160510
Aug. 22, 2000 (JP) ........................................ 2000-251158

(51) Int. Cl.⁷ .......................... C07C 27/00; C07C 1/02; C01B 3/26; C01B 31/18
(52) U.S. Cl. ................... 518/700; 518/702; 518/703; 518/704; 252/373; 423/651; 423/418.2
(58) Field of Search ................. 518/700, 702, 518/703, 704; 252/373; 423/651, 418.2

(56) References Cited

U.S. PATENT DOCUMENTS 5,763,716 A * 6/1998 Benham et al. ............. 585/315
6,218,439 B1 * 4/2001 Kobayashi et al. ......... 518/713

FOREIGN PATENT DOCUMENTS

| AU | 85597/82 | 1/1983 |
| EP | 0 516 441 | 12/1992 |
| GB | 2 179 366 | 3/1987 |
| JP | 6-184559 | 7/1994 |
| WO | 00/09441 | 2/2000 |

OTHER PUBLICATIONS

Goff et al., "Chemical Engineering Progress", pp. 46–53, Aug. 1987.
Derwent Abstract 96–431883/43 of RU 2052376, Sep. 28, 1989.

* cited by examiner

*Primary Examiner*—Jafar Parsa
(74) *Attorney, Agent, or Firm*—Wenderoth, Lind & Ponack, L.L.P.

(57) ABSTRACT

A method for manufacturing a synthesis gas, which makes it possible to procure $CO_2$ inside a synthesis gas-manufacturing plant utilizing the Fisher-Tropsch reaction system, thereby enabling the synthesis gas to be cheaply manufactured by way of the Fisher-Tropsch reaction system without being restricted by the location of $CO_2$ gas source such as an ammonia plant, the synthesis gas comprising a molar ratio of $H_2/CO$ suited for synthesizing gasoline, kerosene and gas oil. This method comprises the steps of, feeding a steam-mixed natural gas to a reformer provided with a combustion radiation portion for burning a fuel, the reformer being heated by the combustion radiation portion, recovering carbon dioxide from a combustion exhaust gas generated at the combustion radiation portion, and adding the carbon dioxide to the steam-mixed natural gas at a location on an upstream side of the reformer.

15 Claims, 14 Drawing Sheets

METHOD OF MANUFACTURING A SYNTHESIS GAS TO BE EMPLOYED FOR THE SYNTHESIS OF GASOLINE, KEROSENE AND GAS OIL

CROSS-REFERENCE TO RELATED APPLICATIONS

This application is based upon and claims the benefit of priority from the prior Japanese Patent Applications No. 2000-160510, filed May 30, 2000; and No. 2000-251158, filed Aug. 22, 2000, the entire contents of which are incorporated herein by reference.

BACKGROUND OF THE INVENTION

This invention relates to a method of manufacturing a synthesis gas to be employed for the synthesis of gasoline, kerosene and gas oil by way of the Fisher-Tropsch reaction system.

Japanese Patent Unexamined Publication No. 6-184559 discloses a method of synthesizing gasoline, etc. wherein a synthesis gas containing hydrogen ($H_2$) and carbon monoxide (CO) is manufactured at first from natural gas, and this synthesis gas is then employed for synthesizing gasoline, etc. by way of a GTL (Gas to Liquid) process according to the Fisher-Tropsch reaction system. In this method, natural gas containing methane as a main component is introduced together with steam into a reformer provided with a reforming catalyst, and the reformer is heated up to a predetermined temperature to allow mainly hydrocarbons contained in the natural gas to react with the steam, thereby manufacturing the synthesis gas.

However, since the composition of synthesis gas produced by this method is constituted by $H_2:CO:CO_2=5:1:0.5$ (molar ratio), the content of hydrogen gas becomes surplus for the synthesis of gasoline, etc. Namely, in the Fisher-Tropsch reaction system where a cobalt catalyst is employed, an optimum molar ratio between $H_2/CO$ is 2. Whereas, when an iron catalyst is employed in the Fisher-Tropsch reaction system, an optimum molar ratio between $H_2/CO$ is 1 to 2.

Under the circumstances, there is disclosed in FIGS. 3 and 4 of Japanese Patent Unexamined Publication No. 6-184559 a reaction system for manufacturing a synthesis gas, which comprises a reformer system consisting of a convection reformer, a self-heating reformer (a partial oxidation furnace) and a convection reformer heater; a carbon dioxide stripper disposed on a downstream side of the reformer system; and a Fisher-Tropsch reactor disposed on a downstream side of the carbon dioxide stripper.

According to this reaction system, the convection reformer is heated by making use of heat generated from the convection reformer heater, and then, a natural gas mixed together with steam is fed together with carbon dioxide that has been separated and recovered from a synthesis gas (to be explained hereinafter) to the convection reformer, thereby allowing part of mainly methane of the natural gas and the carbon dioxide to be reacted with the steam, thus performing a reforming reaction. Thereafter, the resultant reformed gas, the natural gas and oxygen are fed to the self-heating reformer to cause mainly hydrogen gas contained in the reformed gas to burn so as to heat the gaseous mixture up to a temperature which is suited for the reaction between mainly methane contained in the reformed gas and the steam, thereby generating a synthesis gas.

The heat of this synthesis gas is then recovered at the convection reformer heater, thereby enabling the heat to be utilized a heating source for the convection reformer. The synthesis gas after it has been subjected to the aforementioned heat recovery is then fed to the carbon dioxide stripper in which carbon dioxide contained in the synthesis gas is separated and removed from the synthesis gas so as to obtain a gas having a predetermined molar ratio of $CO/H_2$, the resultant gas being subsequently fed to the Fisher-Tropsch reactor. Part of carbon dioxide that has been recovered is allowed to be mixed with the natural gas at a location on an upstream side of the convection reformer, and the rest of the carbon dioxide is allowed to be discharged outside the system.

However, the invention disclosed in the aforementioned Japanese Patent Unexamined Publication No. 6-184559 is accompanied with a problem that since the convection reformer is heated by making use of the heat from the convection reformer heater, only an insufficient quantity of heat is available for reforming the aforementioned steam-containing natural gas at the convection reformer, so that only part of methane in the natural gas can be reformed. Because of this, the reformed gas from the convection reformer is fed to the self-heating reformer (a partial oxidation furnace) so as to cause the hydrogen gas in the reformed gas to burn using the oxygen that has been fed to the self-heating reformer, thereby heating the gaseous mixture up to a temperature required for generating a predetermined synthesis gas.

As a result, a large quantity of oxygen is required to be fed to the self-heating reformer. Since oxygen is generally produced in an oxygen plant where oxygen is isolated from air atmosphere through a low temperature treatment, the employment of a large quantity of oxygen leads not only to the consumption of enormous quantity of energy but also to an increase in scale of plant, thereby increasing the manufacturing cost of the synthesis gas.

On the other hand, there is also disclosed a method of manufacturing a synthesis gas in "Chemical Engineering Progress", Wang; August 1987, pp.46–53. More specifically, the production of oxoalcohol through a reaction of olefin with a mixed gas comprising hydrogen and carbon monoxide at a ratio of $H_2/CO=1$ to 2 is described in the left column page 49 of the publication.

This publication also discloses the manufacture of synthesis gas containing hydrogen and carbon monoxide at a ratio of $H_2/CO=1$ to 2 in the right column page 49 of the publication as Method 4A wherein, on the occasion of feeding a desulfurized natural gas to the steam reformer, carbon monoxide is added from outside the system (for example, from a neighboring ammonia plant) to the natural gas so as to allow a reaction to take place among the natural gas, steam and carbon dioxide. Although this method is advantageous for the reason that the production of hydrogen in an excessive ratio can be minimized without necessitating the addition of oxygen as described in the right column lines 8–11 page 49 of the publication, this method is disadvantageous mainly because it requires a $CO_2$ source (for example, a neighboring ammonia plant). Therefore, the aforementioned Method 4A is useless except where a $CO_2$ source such as an ammonia plant is located in the neighborhood.

BRIEF SUMMARY OF THE INVENTION

Therefore, an object of this invention is to provide a method for manufacturing a synthesis gas, which makes it possible to procure $CO_2$ inside a synthesis gas-manufacturing plant utilizing the Fisher-Tropsch reaction system, thereby enabling the synthesis gas to be cheaply manufactured by way of the Fisher-Tropsch reaction system without being restricted by the location of $CO_2$ gas source such as an ammonia plant, the synthesis gas containing hydrogen gas and carbon monoxide at a molar ratio of $H_2/CO$ which is suited for synthesizing gasoline, kerosene and gas oil.

Another object of this invention is to provide a method of manufacturing a synthesis gas comprising hydrogen gas and carbon monoxide at a molar ratio of $H_2/CO$ which is suited for synthesizing gasoline, kerosene and gas oil by way of the Fisher-Tropsch reaction system, wherein a carbon dioxide-containing natural gas is fed to a reformer and then the resultant reformed gas is introduced from the reformer into the partial oxidation furnace so as to allow hydrogen in the reformed gas to burn through a reaction thereof with oxygen that has been fed to the partial oxidation furnace, the method being featured in that it is capable of minimizing the quantity of feeding oxygen to the partial oxidation furnace thereby making it possible to miniaturize an oxygen plant for producing oxygen.

Namely, this invention provides a method of manufacturing a synthesis gas containing CO and $H_2$, which is suited for use in synthesizing gasoline, kerosene and gas oil by way of the Fisher-Tropsch reaction system; the method comprising the steps of;

feeding a steam-mixed natural gas to a reformer which is provided with a combustion radiation portion for burning a fuel, the reformer being designed to be heated by the combustion radiation portion;

recovering carbon dioxide from a combustion exhaust gas generated at the combustion radiation portion; and adding the carbon dioxide to the steam-mixed natural gas at a location on an upstream side of the reformer, thereby allowing a reforming reaction to take place to obtain a synthesis gas containing CO and $H_2$ at a molar ratio of $H_2/CO=1$ to 2.5, which is suited for use in synthesizing gasoline, kerosene and gas oil.

In the method of manufacturing a synthesis gas according to this invention, carbon dioxide may be recovered from the synthesis gas produced in the reformer, the resultant carbon dioxide being allowed to recirculate in a region on an upstream side of the reformer.

In the method of manufacturing a synthesis gas according to this invention, the process of recovering carbon dioxide from the synthesis gas may be performed by making use of the same absorbent solution as employed in the process of recovering carbon dioxide from the combustion exhaust gas employed for heating the reformer. The process of recovering carbon dioxide from the synthesis gas may be performed using an amine-based absorption solution or a potassium carbonate-based absorption solution, while the process of recovering carbon dioxide from the combustion exhaust gas may be performed using alkanol amine which is minimal in deterioration other than monoethanol amine absorbent solution which is conventionally employed.

In the method of manufacturing a synthesis gas according to this invention, a preliminary reformer may be arranged at an upstream of the reformer, the natural gas to which steam has been added is supplied to the reformer via the preliminary reformer, the carbon dioxide recovered from the combustion exhaust is fed to a passageway connecting the reformer and the preliminary reformer.

In the method of manufacturing a synthesis gas according to this invention, the step of adding the carbon dioxide to the steam-mixed natural gas may be performed by arranging a moistening device at a posterior stage of the reformer, introducing a synthesis gas from the reformer into the moistening device, heating the moistening device with waste heat of the synthesis gas, feeding natural gas and water to the moistening device, and adding steam to the natural gas in the moistening device.

In the method of manufacturing a synthesis gas according to this invention, a purging gas containing carbon dioxide may be circulated in a region on an upstream side of the reformer, the purging gas is produced in the Fisher-Tropsch reaction system on the occasion of synthesizing gasoline, kerosene and gas oil by way of the Fisher-Tropsch reaction system by making use of a synthesis gas produced in the reformer.

This invention also provides an alternative method of manufacturing a synthesis gas containing CO and $H_2$, which is suited for use in synthesizing gasoline, kerosene and gas oil by way of the Fisher-Tropsch reaction system; the method comprising the steps of;

feeding a steam-mixed natural gas to a reformer which is provided with a combustion radiation portion for burning a fuel, the reformer being designed to be heated by the combustion radiation portion;

recovering carbon dioxide from a combustion exhaust gas generated at the combustion radiation portion;

adding the carbon dioxide to the steam-mixed natural gas at a location on an upstream side of the reformer, thereby allowing a reforming reaction to take place; and introducing a reformed gas from the reformer into a partial oxidation furnace simultaneous with an introduction of oxygen into the partial oxidation furnace, thereby allowing the reformed gas to react with the oxygen to obtain a synthesis gas comprising Co and $H_2$ at a molar ratio of $H_2/CO=1$ to 2.5, which is suited for use in synthesizing gasoline, kerosene and gas oil.

In this alternative method of manufacturing a synthesis gas according to this invention, carbon dioxide may be recovered from the synthesis gas produced in the partial oxidation furnace, the resultant carbon dioxide being allowed to recirculate in a region on an upstream side of the reformer.

In this alternative method of manufacturing a synthesis gas according to this invention, the process of recovering carbon dioxide from the synthesis gas may be performed by making use of the same absorbent solution as employed in the process of recovering carbon dioxide from the combustion exhaust gas discharged from the combustion radiation portion of the reformer. The process of recovering carbon dioxide from the synthesis gas may be performed using an amine-based absorption solution or a potassium carbonate-based absorption solution, while the process of recovering carbon dioxide from the combustion exhaust gas may be performed using alkanol amine which is minimal in deterioration other than monoethanol amine absorbent solution which is conventionally employed.

In this alternative method of manufacturing a synthesis gas according to this invention, a preliminary reformer may be arranged at an upstream of the reformer, the natural gas to which steam has been added is supplied to the reformer via the preliminary reformer, the carbon dioxide recovered from the combustion exhaust is fed to a passageway connecting the reformer and the preliminary reformer.

In this alternative method of manufacturing a synthesis gas according to this invention, the step of adding the carbon dioxide to the steam-mixed natural gas may be performed by arranging a moistening device at a posterior stage of the reformer, introducing a synthesis gas from the reformer into the moistening device, heating the moistening device with waste heat of the synthesis gas, feeding natural gas and water to the moistening device, and adding steam to the natural gas in the moistening device.

In this alternative method of manufacturing a synthesis gas according to this invention, it is preferable to feed a carbon dioxide-mixed oxygen to the partial oxidation furnace. Further, steam may be fed to the partial oxidation furnace.

In this alternative method of manufacturing a synthesis gas according to this invention, a purging gas containing carbon dioxide may be circulated in a region on an upstream side of the reformer, the purging gas is produced in the Fisher-Tropsch reaction system on the occasion of synthesizing gasoline, kerosene and gas oil by way of the Fisher-Tropsch reaction system by making use of a synthesis gas produced in the partial oxidation furnace.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Next, the method of manufacturing a synthesis gas which is suited for use in synthesizing gasoline, kerosene and gas oil will be explained with reference to drawings.

(First Embodiment)

Figure 1:
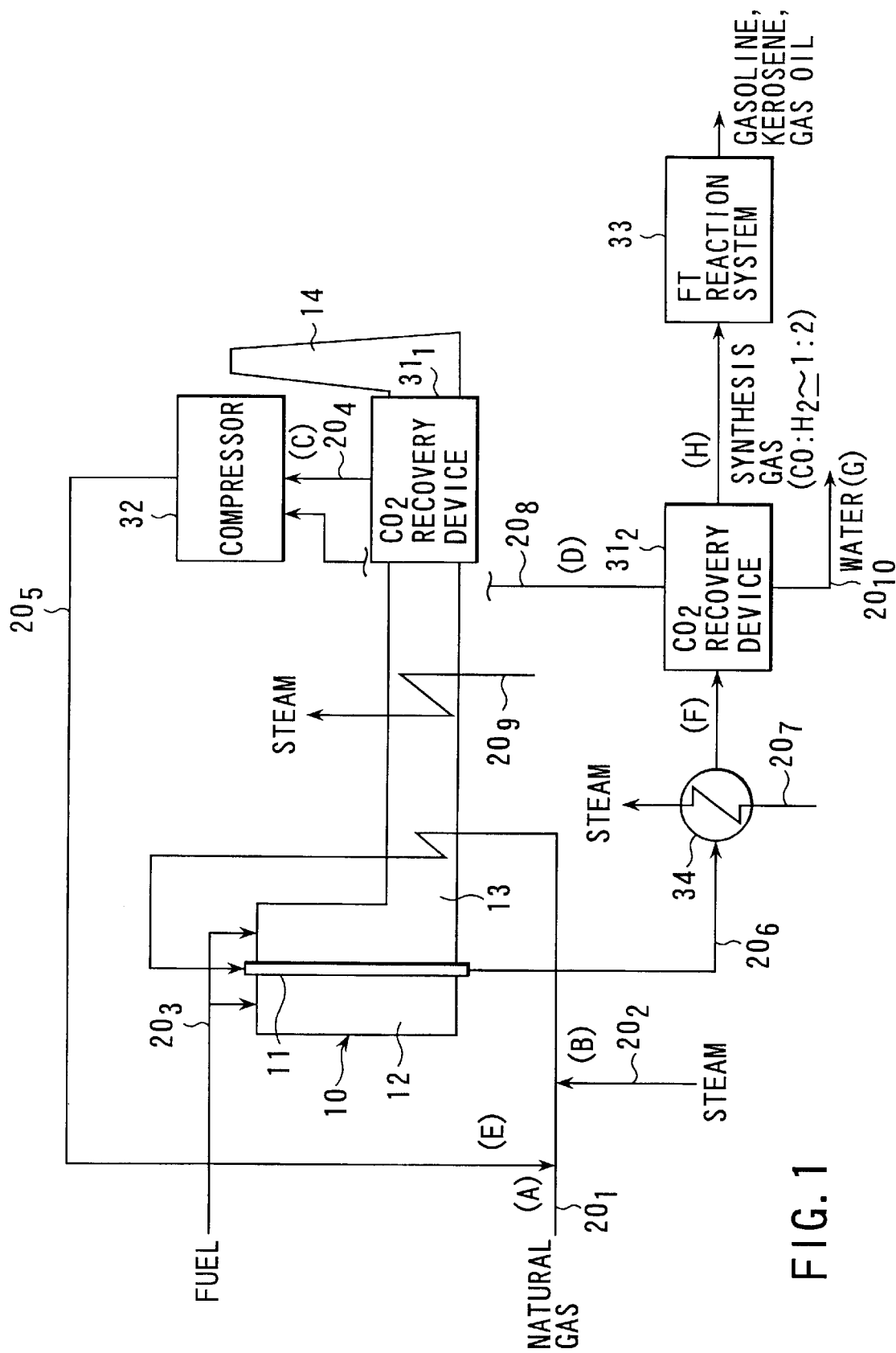
FIG. 1 is a flow chart illustrating main manufacturing steps of synthesis gas in a synthesizing plant of gasoline, kerosene and gas oil, which can be employed according to a first Embodiment of this invention.

FIG. 1 is a flow chart illustrating main manufacturing steps of synthesis gas in a synthesizing plant of gasoline, kerosene and gas oil, which can be employed according to the first Embodiment of this invention.

Referring to FIG. 1, a reformer 10 comprises a reaction tube 11 adapted to be employed for steam reforming, a combustion radiation portion 12 disposed around the reaction tube 11, and a chimney 14 which is communicated via a convection portion (waste heat recovering portion) 13 with the combustion radiation portion 12. The reaction tube 11 is filled therein with a nickel-based catalyst for instance.

A fuel-introducing passageway 203 is communicated with the combustion radiation portion 12 of the reformer 10. A raw gas-introducing passageway 20$_1$ is communicated via a convection portion 13 of the reformer 10 with an upper end of the reaction tube 11. This raw gas-introducing passageway 20$_1$ may be provided with a desulfurizer (not shown). A steam-introducing passageway 20$_2$ is communicated with the raw gas-introducing passageway 20$_1$ which is positioned on an upstream side of the convection portion 13.

A first carbon dioxide recovery device 31$_1$ is disposed at the convection portion 13 of the reformer 10 so as to enable it to recover carbon dioxide from the combustion exhaust gas existing in the convection portion 13. This first carbon dioxide recovery device 31$_1$ is communicated via a passageway 20$_4$ with a compressor 32. This compressor 32 is communicated via a passageway 20$_5$ with the raw gas-introducing passageway 20$_1$ which is positioned on an upstream side of the reformer 10.

A synthesis gas flow passageway 20$_6$ is communicated via one end thereof with a lower end of the reaction tube 11 of the reformer 10 and also communicated via the other end thereof with the Fisher-Tropsch (FT) reaction system 33 which is filled with a cobalt-based catalyst for instance. By the way, the catalyst to be filled in this FT reaction system 33 may not be confined to the cobalt-based catalyst but may be an iron-based catalyst for instance. A heat exchanger 34 and a second carbon dioxide recovery device $31_2$ are successively disposed at midways of the synthesis gas flow passageway $20_6$ in the mentioned order on the downstream side of the reformer 10. The heat exchanger 34 is intersected with a passageway $20_7$ so as to heat for example a boiler water passing through this passageway $20_7$, thereby generating a high-pressure steam. The second carbon dioxide recovery device $31_2$ is communicated via a passageway $20_8$ with the compressor 32. By the way, a passageway $20_9$ for flowing a boiler water for instance is intersected with the convection portion 13 of the reformer 10 so as to allow the combustion exhaust gas of the convection portion 13 to be heat-exchanged with the aforementioned boiler water, thereby cooling the combustion exhaust gas and at the same time, heating the boiler water to generate a high-pressure steam.

Next, the method of manufacturing a synthesis gas will be explained with reference to the aforementioned synthesizing plant shown in FIG. 1.

First of all, a fuel for combustion is fed via the fuel-introducing passageway $20_3$ to the combustion radiation portion 12 of the reformer 10 so as to allow the fuel to burn together with air, thereby heating the reaction tube 11 up to a predetermined temperature. The combustion exhaust gas containing carbon dioxide and generated at this combustion radiation portion 12 is allowed to flow via the convection portion 13 into the chimney 14. The combustion exhaust gas is heat-exchanged with the natural gas passing through the raw gas-introducing passageway $20_1$ as well as with the boiler water passing through the passageway $20_9$ as the combustion exhaust gas passes through the convection portion 13, thereby cooling the combustion exhaust gas. The carbon dioxide in the combustion exhaust gas that has been cooled in this manner is recovered by the first carbon dioxide recovery device $31_1$ and then, transferred via the passageway $20_4$ to the compressor 32. The combustion exhaust gas from which carbon dioxide has been removed is then allowed to be released to air atmosphere through the chimney 14.

Natural gas containing methane as a main component is fed to the raw gas-introducing passageway $20_1$. At this moment, the carbon dioxide that has been pressurized by the compressor 32 is added via the passageway $20_5$ to the natural gas at a predetermined ratio. Further, steam is also added via the steam-introducing passageway $20_2$ to the natural gas at a predetermined ratio. By the way, as for this steam, the steam that has been generated through a heat exchange between the boiler water and the synthesis gas at the heat exchanger 34 as well as the steam that has been generated through a heat exchange between the boiler water and the combustion exhaust gas at the convection portion 13 of reformer 10 can be utilized.

The natural gas mixed with carbon dioxide and steam is allowed to flow inside the raw gas-introducing passageway $20_1$ and heated (preliminarily heated) as the aforementioned mixed natural gas passes through the convection portion 13 of reformer 10. Thereafter, this mixed natural gas is fed to the reaction tube 11. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the following formulas (1) and (2).

$$CH_4 + H_2O \rightleftarrows CO + 3H_2 \quad (1)$$

$$CO + H_2O \rightleftarrows CO_2 + H_2 \quad (2)$$

In these formulas (1) and (2) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of reformer can be obtained. Therefore, it is possible to manufacture a synthesis gas having a molar ratio of $H_2/CO$ ranging from 1 to 2.5 by setting the ratios among the natural gas, steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam. Concurrently, the synthesis gas itself is cooled and then, fed to the second carbon dioxide recovery device $31_2$, in which carbon dioxide included in the synthesis gas is recovered and at the same time, the water that has been concurrently produced is discharged outside the system through a passageway $20_{10}$. The carbon dioxide thus recovered is transferred via the passageway $20_8$ to the compressor 32 so as to be compressed together with the carbon dioxide that has been recovered at the first carbon dioxide recovery device $31_1$, the resultant compressed carbon dioxide being transferred via the passageway $20_5$ to the raw gas-introducing passageway $20_1$ and added to the natural gas existing in the raw gas-introducing passageway $20_1$.

The synthesis gas from which carbon dioxide has been removed as explained above is then transferred via the passageway $20_6$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this first Embodiment, on the occasion of performing the reforming reaction of steam-mixed natural gas by feeding the steam-mixed natural gas via the raw gas-introducing passageway $20_1$ to the reaction tube 11 of the reformer 10, the combustion radiation portion 12 is provided for the purpose of heating the reaction tube 11 of the reformer 10 because of the fact that the reforming reaction is an endothermic reaction. Further, the combustion exhaust gas discharged from the combustion radiation portion 12 is cooled, and then, the carbon dioxide contained in the combustion exhaust gas is recovered at the first carbon dioxide recovery device $31_1$ and compressed at the compressor 32, the resultant compressed carbon dioxide being transferred via the passageway $20_5$ to the raw gas-introducing passageway $20_1$ disposed on an upstream side of the reformer 10 so as to be added to the natural gas flowing through the raw gas-introducing passageway $20_1$. Additionally, the carbon dioxide contained in the synthesis gas obtained through the reformer 10 is also recovered at the second carbon dioxide recovery device $31_2$ and then, transferred via the passageway $20_8$ to the compressor 32 so as to be compressed together with the carbon dioxide recovered at the first carbon dioxide recovery device $31_1$, the resultant compressed carbon dioxide being transferred via the passageway $20_5$ to the raw gas-introducing passageway $20_1$ and added to the natural gas flowing through the raw gas-introducing passageway $20_1$.

By feeding carbon dioxide to the steam-mixed natural gas in this manner, it is possible to manufacture a synthesis gas comprising CO and $H_2$ at a molar ratio of $H_2/CO=1$ to 2.5. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Therefore, since it is possible to procure carbon dioxide inside the manufacturing plant (mainly the reformer) of synthesis gas which includes the Fisher-Tropsch reaction system without depending on a separate carbon dioxide source, a synthesis gas containing hydrogen gas and carbon monoxide at a molar ratio of $H_2/CO$ which is suited for synthesizing gasoline, kerosene and gas oil by way of the Fisher-Tropsch reaction system can be cheaply manufactured at any place without being restricted by the location of $CO_2$ gas source such as an ammonia plant.

Example 1

In this Example 1, the manufacture of a synthesis gas according to the aforementioned first Embodiment will be specifically explained with reference to FIG. 1.

A fuel (natural gas) was fed to the combustion radiation portion 12 of the reformer 10 at a flow rate of 625 kg·mol/hr and burnt together with air at the combustion radiation portion 12. Further, natural gas, steam and carbon dioxide (which was recovered from the combustion exhaust gas and synthesis gas both derived from the reformer 10) were introduced into the raw gas-introducing passageway $20_1$ under the conditions shown in the following Table 1 and then, subjected to steam reforming at the reaction tube 11 of the reformer 10, thereby manufacturing a synthesis gas. The composition of the synthesis gas thus obtained is shown in the Table 1.

In Table 1, the item (A) represents natural gas to be fed to the raw gas-introducing passageway $20_1$; the item (B) represents steam to be fed to the raw gas-introducing passageway $20_1$; the item (C) represents carbon dioxide which was recovered by means of the first carbon dioxide recovery device $31_1$ from the combustion exhaust gas generated at the combustion radiation portion 12 of the reformer 10; the item (D) represents carbon dioxide which was recovered by means of the second carbon dioxide recovery device $31_2$ from the synthesis gas; the item (E) represents carbon dioxide which was recovered by means of the first and second carbon dioxide recovery devices $31_1$ and $31_2$, this recovered carbon dioxide being subsequently transferred to the raw gas-introducing passageway $20_1$ after it was compressed by the compressor 32; the item (F) represents the synthesis gas which was manufactured at the reformer 10 so as to be transferred via the heat exchanger 34 to the second carbon dioxide recovery device $31_2$; the item (G) represents water discharged from the second carbon dioxide recovery device $31_2$; and the item (H) represents the synthesis gas obtained after the removal of carbon dioxide by means of the second carbon dioxide recovery device $31_2$, the synthesis gas being subsequently fed to the FT reaction system 33. These items (A) to (H) are also shown in FIG. 1.

TABLE 1

| Item | (A) | (B) | (C) | (D) | (E) | (F) | (G) | (H) |
|---|---|---|---|---|---|---|---|---|
| Composition | | | | | | | | |
| $CH_4$ (mol %) | 94 | — | — | — | — | 1.1 | — | 2.1 |
| $C_2H_6$ (mol %) | 6 | — | — | — | — | — | — | — |
| $C_2H_8+$ (mol %) | — | — | — | — | — | — | — | — |
| $H_2$ (mol %) | — | — | — | — | — | 34.3 | — | 64.9 |
| CO (mol %) | — | — | — | — | — | 17.2 | — | 32.5 |
| $CO_2$ (mol %) | — | — | 100 | 100 | 100 | 13.8 | — | — |
| $H_2O$ (mol %) | — | 100 | — | — | — | 33.6 | 100 | 0.5 |
| Total (mol %) | 100 | 100 | 100 | 100 | 100 | 100 | 100 | 100 |
| Flow rate(kg · mol/hr) | 1000 | 3180 | 306 | 1035 | 1341 | 7480 | 2489 | 3956 |
| Temperature (° C.) | 400 | 200 | 40 | 40 | 150 | 40 | 40 | 40 |
| Pressure (kg/cm²) | 20 | 20 | 0.1 | 0.1 | 20 | 15 | 0.1 | 15 |

As seen from Table 1, because of the process wherein the carbon dioxide which was recovered by means of the first and second carbon dioxide recovery devices $31_1$ and $31_2$ was added to the steam-mixed natural gas, it was possible to manufacture a synthesis gas having a molar ratio of $H_2/CO=$ about 2.

(Second Embodiment)

Figure 2:
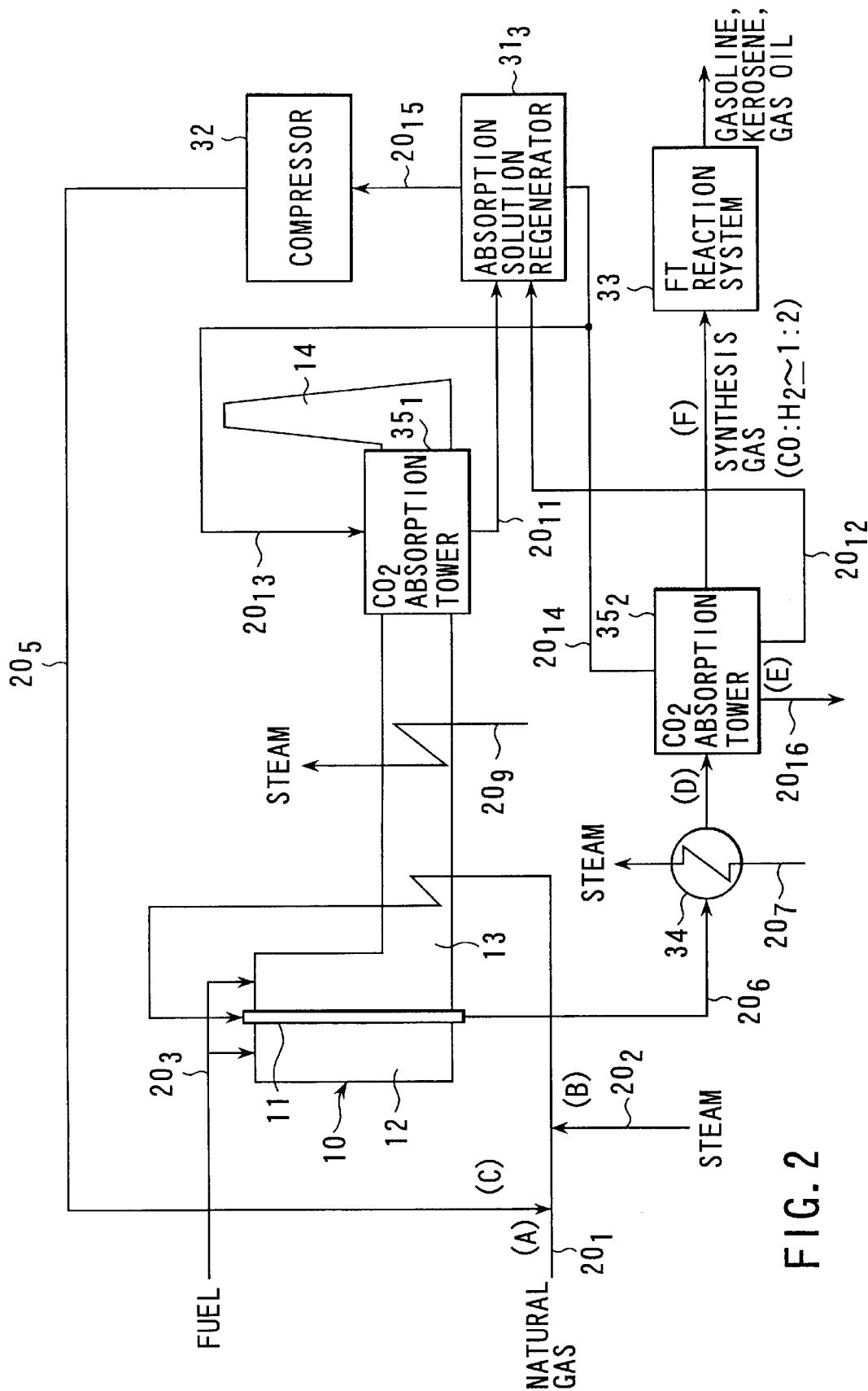
FIG. 2 is a flow chart illustrating main manufacturing steps of synthesis gas in a synthesizing plant of gasoline, kerosene and gas oil, which can be employed according to a second Embodiment of this invention.

FIG. 2 is a flow chart illustrating main manufacturing steps of synthesis gas in a synthesizing plant of gasoline, kerosene and gas oil, which can be employed according to the second Embodiment of this invention. In this FIG. 2, the same components as employed in the aforementioned FIG. 1 are identified by the same numbers, thereby omitting the explanation thereof.

This synthesizing plant is featured in that a first carbon dioxide absorption tower $35_1$ is disposed at the convection portion 13 of the reformer 10, and an absorption solution for absorbing carbon dioxide in the combustion exhaust gas at the convection portion 13 is placed inside the first carbon dioxide absorption tower $35_1$. Furthermore, a second carbon dioxide absorption tower $35_2$ housing the same kind of absorption solution as that of the first carbon dioxide absorption tower $35_1$ is disposed at the synthesis gas flow passageway $20_6$ which is disposed on an downstream side of the heat exchanger 34. These first and second carbon dioxide absorption towers $35_1$ and $35_2$ are communicated respectively via passageways $20_{11}$ and $20_{12}$ with an absorption solution regenerator $31_3$. The absorption solution employed for separating and recovering carbon dioxide at this absorption solution regenerator $31_3$ is recirculated via a passageway $20_{13}$ to the first carbon dioxide absorption tower $35_1$ and also recirculated via a passageway $20_{14}$ which is branched from the passageway $20_{13}$ to the second carbon dioxide absorption tower $35_2$. The absorption solution regenerator $31_3$ is communicated via a passageway $20_{15}$ with the compressor 32.

Next, the method of manufacturing a synthesis gas will be explained with reference to the aforementioned synthesizing plant shown in FIG. 2.

First of all, a fuel for combustion is fed via the fuel-introducing passageway $20_3$ to the combustion radiation portion 12 of the reformer 10 so as to allow the fuel to burn together with air, thereby heating the reaction tube 11 up to a predetermined temperature. The combustion exhaust gas containing carbon dioxide and generated at this combustion radiation portion 12 is allowed to flow via the convection portion 13 into the chimney 14. The combustion exhaust gas is heat-exchanged with the natural gas passing through the raw gas-introducing passageway $20_1$ as well as with the boiler water passing through the passageway $20_9$ as the combustion exhaust gas passes through the convection portion 13, thereby cooling the combustion exhaust gas. The carbon dioxide in the combustion exhaust gas that has been cooled in this manner is absorbed by the carbon dioxide absorption solution placed inside the first carbon dioxide absorption tower $35_1$. The absorption solution having carbon dioxide absorbed therein is transferred via the passageway $20_{11}$ to the absorption solution regenerator $31_3$ to recover the carbon dioxide, which is then transferred via the passageway $20_{15}$ to the compressor 32. The absorption solution from which the carbon dioxide has been removed is recirculated via the passageway $20_{13}$ to the first carbon dioxide absorption tower $35_1$. The cooled combustion exhaust gas from which the carbon dioxide has been removed is then released to air atmosphere through the chimney 14.

Natural gas containing methane as a main component is fed to the raw gas-introducing passageway $20_1$. At this moment, the carbon dioxide that has been pressurized by the compressor 32 is added via the passageway $20_5$ to the natural gas at a predetermined ratio. Further, steam is also added via the steam-introducing passageway $20_2$ to the natural gas at a predetermined ratio. By the way, as for this steam, the steam that has been generated through a heat exchange between the boiler water and the synthesis gas at the heat exchanger 34 as well as the steam that has been generated through a heat exchange between the boiler water and the combustion exhaust gas at the convection portion 13 of reformer 10 can be utilized.

The natural gas mixed with carbon dioxide and steam is allowed to flow inside the raw gas-introducing passageway $20_1$ and heated (preliminarily heated) as the aforementioned mixed natural gas passes through the convection portion 13 of reformer 10. Thereafter, this mixed natural gas is fed to the reaction tube 11. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

In this reforming reaction, it is possible to manufacture a synthesis gas having a molar ratio of $H_2/CO$ ranging from 1 to 2.5 by setting the ratios among the natural gas (methane), steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam, thereby cooling the synthesis gas itself. This cooled synthesis gas is then transferred to the second carbon dioxide absorption tower $35_2$ housing the same kind of absorption solution as placed inside the first carbon dioxide absorption tower $35_1$, thereby allowing the carbon dioxide included inside the synthesis gas to be absorbed by the absorption solution, and at the same time, the water that has been concurrently produced is discharged outside the system through a passageway $20_{16}$. The absorption solution having carbon dioxide absorbed therein is then transferred via the passageway $20_{12}$ to the absorption solution regenerator $31_3$ in which the carbon dioxide absorbed therein is separated and recovered from the absorption solution together with the carbon dioxide absorbed in the absorption solution that has been transferred from the first carbon dioxide absorption tower $35_1$.

The carbon dioxide thus recovered is then transferred via the passageway $20_{15}$ to the compressor 32 so as to be compressed therein, the compressed carbon dioxide being thereafter transferred via the passageway $20_5$ to the raw gas-introducing passageway $20_1$ and added to the natural gas existing inside the raw gas-introducing passageway $20_1$. The absorption solution from which the carbon dioxide has been removed at the absorption solution regenerator $31_3$ is recirculated via the passageway $20_{14}$ to the second carbon dioxide absorption tower $35_2$.

The synthesis gas from which carbon dioxide has been removed as explained above is then transferred via the passageway $20_6$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this second Embodiment, it is possible to manufacture a synthesis gas comprising Co and $H_2$ at a molar ratio of $H_2/CO=1$ to 2.5 in the same manner as in the case of the first Embodiment. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the carbon dioxide included in the combustion exhaust gas which has been discharged from the combustion radiation portion 12 of the reformer 10 as well as the carbon dioxide included in the synthesis gas can be absorbed by making use of the same kind of absorption solution at the first and second carbon dioxide absorption towers $35_1$ and $35_2$, and the carbon dioxide thus absorbed in the absorption solution is subsequently recovered by the absorption solution regenerator $31_3$, it is possible to simplify the synthesizing plant.

Example 2

In this Example 2, the manufacture of a synthesis gas according to the aforementioned second Embodiment will be specifically explained with reference to FIG. 2.

A fuel (natural gas) was fed to the combustion radiation portion 12 of the reformer 10 at a flow rate of 625 kg·mol/hr and burnt together with air at the combustion radiation portion 12. Further, natural gas, steam and carbon dioxide (which was recovered from the combustion exhaust gas and synthesis gas both derived from the reformer 10) were introduced into the raw gas-introducing passageway $20_1$ under the conditions shown in the following Table 2 and then, subjected to steam reforming at the reaction tube 11 of the reformer 10, thereby manufacturing a synthesis gas. The composition of the synthesis gas thus obtained is shown in the Table 2.

In Table 2, the item (A) represents natural gas to be fed to the raw gas-introducing passageway $20_1$; the item (B) represents steam to be fed to the raw gas-introducing passageway $20_1$; the item (C) represents carbon dioxide which was absorbed by the same kind of absorption solution and recovered by means of the absorption solution regenerator $31_3$, the recovered carbon dioxide being subsequently compressed by the compressor 32 before it was transferred to the raw gas-introducing passageway $20_1$; the item (D) represents the synthesis gas which was manufactured at the reformer 10 so as to be transferred via the heat exchanger 34 to the second carbon dioxide absorption tower $35_2$; the item (E) represents water discharged from the second carbon dioxide absorption tower $35_2$; the item (F) represents the synthesis gas obtained after the removal of carbon dioxide by means of the second carbon dioxide absorption tower $35_2$ the synthesis gas being subsequently fed to the FT reaction system 33. These items (A) to (F) are also shown in FIG. 2.

TABLE 2

| Item | (A) | (B) | (C) | (D) | (E) | (F) |
|---|---|---|---|---|---|---|
| Composition | | | | | | |
| $CH_4$ (mol %) | 94 | — | — | 1.1 | — | 2.1 |
| $C_2H_6$ (mol %) | 6 | — | — | — | — | — |
| $C_2H_8+$ (mol %) | — | — | — | — | — | — |
| $H_2$ (mol %) | — | — | — | 34.3 | — | 64.9 |
| CO (mol %) | — | — | — | 17.2 | — | 32.5 |
| $CO_2$ (mol %) | — | — | 100 | 13.8 | — | — |
| $H_2O$ (mol %) | — | 100 | — | 33.6 | 100 | 0.5 |
| Total (mol %) | 100 | 100 | 100 | 100 | 100 | 100 |
| Flow rate(kg · mol/hr) | 1000 | 3180 | 1338 | 7475 | 2488 | 3956 |
| Temperature (° C.) | 400 | 200 | 150 | 40 | 40 | 40 |
| Pressure (kg/cm²) | 20 | 20 | 20 | 15 | 0.1 | 15 |

As seen from Table 2, because of the process wherein the carbon dioxide which was absorbed by the same kind of absorption solution and recovered at the absorption solution regenerator $31_3$ was added to the steam-mixed natural gas, it was possible to manufacture a synthesis gas having a molar ratio of $H_2$/CO=about 2.

(Third Embodiment)

Figure 3:
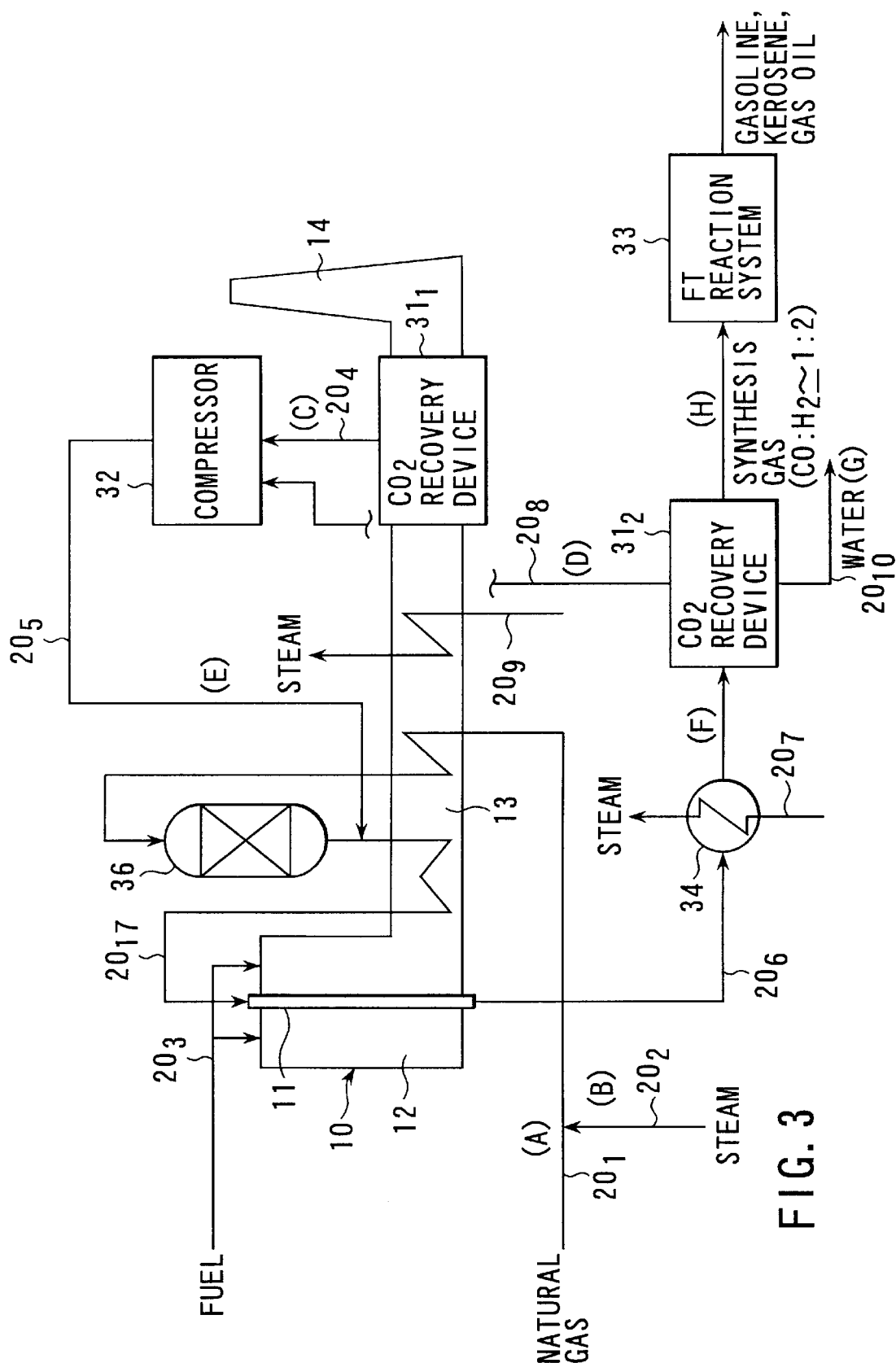
FIG. 3 is a flow chart illustrating main manufacturing steps of synthesis gas in a synthesizing plant of gasoline, kerosene and gas oil, which can be employed according to a third Embodiment of this invention.

FIG. 3 is a flow chart illustrating main manufacturing steps of synthesis gas in a synthesizing plant of gasoline, kerosene and gas oil, which can be employed according to the third Embodiment of this invention. In this FIG. 3, the same components as employed in the aforementioned FIG. 1 are identified by the same numbers, thereby omitting the explanation thereof.

This synthesizing plant is featured in that a preliminary reformer 36 is disposed on an upstream side of the reformer 10. The raw gas-introducing passageway 201 is communicated with a top portion of the preliminary reformer 36. This preliminary reformer 36 is communicated via the passageway $20_{17}$ with an upper end of the reaction tube 11 of the reformer 10. The passageway $20_{17}$ is communicated via the convection portion 13 of the reformer 10 with the reaction tube 11. The compressor 32 is communicated via the passageway $20_5$ to the passageway $20_{17}$ which is disposed to connect the preliminary reformer 36 with the reformer 10.

Next, the method of manufacturing a synthesis gas will be explained with reference to the aforementioned synthesizing plant shown in FIG. 3.

First of all, in the same manner as in the first Embodiment, a fuel for combustion is fed to the combustion radiation portion 12 of the reformer 10 so as to heat the reaction tube 11 up to a predetermined temperature. The carbon dioxide included in the combustion exhaust gas which has been generated at the combustion radiation portion 12 and cooled subsequently is recovered at the first carbon dioxide recovery device $31_1$ and then, transferred to the compressor 32.

Natural gas containing methane as a main component is fed to the raw gas-introducing passageway $20_1$. At this moment, steam is also added via the steam-introducing passageway $20_2$ to the natural gas at a predetermined ratio. The natural gas mixed with steam is allowed to flow inside the raw gas-introducing passageway $20_1$ and heated (preliminarily heated) as the aforementioned mixed natural gas passes through the convection portion 13 of reformer 10. Thereafter, this mixed natural gas is fed to the preliminary reformer 36. In this preliminary reformer 36, the hydrocarbons of the natural gas which have two or more carbon atoms, mainly ethane, are reformed into methane having one carbon atom, CO and $H_2$.

The steam-mixed natural gas preliminarily reformed in this manner is then fed via the passageway $20_{17}$ to the reaction tube 11 of the reformer 10. On this occasion, the carbon dioxide that has been compressed by the compressor 32 is fed at a predetermined ratio via the passageway $20_5$ to the steam-mixed natural gas reformed preliminarily as mentioned above and flowing through the passageway $20_{17}$. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

In this reforming reaction, it is possible to manufacture a synthesis gas having a molar ratio of $H_2$/CO ranging from 1 to 2.5 by setting the ratios among the natural gas (methane), steam and carbon dioxide to such that the ratio between methane ($CH_4$) and stream ($H_2O$) is $CH_4$:$H_2O$=1:1.5 to 1:3; while the ratio between methane ($CH_4$) and carbon dioxide ($CO_2$) is $CH_4$:$CO_2$=1:1 to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam. Concurrently, the synthesis gas itself is cooled and then, fed to the second carbon dioxide recovery device $31_2$, in which carbon dioxide included in the synthesis gas is recovered and at the same time, the water that has been concurrently produced is discharged outside the system through a passageway $20_{10}$. The carbon dioxide thus recovered is transferred via the passageway $20_8$ to the compressor 32 so as to be compressed together with the carbon dioxide that has been recovered at the first carbon dioxide recovery device $31_1$, the resultant compressed carbon dioxide being added at a predetermined ratio via the passageway $20_5$ to the steam-mixed natural gas reformed preliminarily and flowing through the passageway $20_{17}$.

The synthesis gas from which carbon dioxide has been removed as explained above is then transferred via the passageway $20_6$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this third Embodiment, it is possible to manufacture a synthesis gas comprising CO and $H_2$ at a molar ratio of $H_2/CO=1$ to 2.5 in the same manner as in the case of the first Embodiment. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the preliminary reformer 36 is disposed on an upstream side of the reformer 10 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 10. As a result, the quantity of fuel to be fed to the combustion radiation portion 12 of the reformer 10 can be reduced, thus making it possible to manufacture a synthesis gas with a decreased quantity of fuel.

into the raw gas-introducing passageway 201 under the conditions shown in the following Table 3, while carbon dioxide (which was recovered from the combustion exhaust gas and synthesis gas both derived from the reformer 10) was added under the conditions shown in the following Table 3 to the steam-mixed natural gas reformed preliminarily and flowing through the passageway $20_{17}$ which was disposed to connect the preliminary reformer 36 with the reformer 10. As a result, the natural gas was steam-reformed at the reaction tube 11 of the reformer 10, thereby manufacturing a synthesis gas. The composition of the synthesis gas thus obtained is shown in the Table 3.

In Table 3, the item (A) represents natural gas to be fed to the raw gas-introducing passageway $20_1$; the item (B) represents steam to be fed to the raw gas-introducing passageway $20_1$; the item (C) represents carbon dioxide which was recovered by means of the first carbon dioxide recovery device $31_1$ from the combustion exhaust gas generated at the combustion radiation portion 12 of the reformer 10; the item (D) represents carbon dioxide which was recovered by means of the second carbon dioxide recovery device $31_2$ from the synthesis gas; the item (E) represents carbon dioxide which was recovered by means of the first and second carbon dioxide recovery devices $31_1$ and $31_2$, this recovered carbon dioxide being subsequently introduced into the passageway $20_{17}$ which was disposed to connect the preliminary reformer 36 with the reformer 10 after it was compressed by the compressor 32; the item (F) represents the synthesis gas which was manufactured at the reformer 10 so as to be transferred via the heat exchanger 34 to the second carbon dioxide recovery device $31_2$; the item (G) represents water discharged from the second carbon dioxide recovery device $31_2$; and the item (H) represents the synthesis gas obtained after the removal of carbon dioxide by means of the second carbon dioxide recovery device $31_2$, the synthesis gas being subsequently fed to the FT reaction system 33. These items (A) to (H) are also shown in FIG. 3.

TABLE 3

| Item | (A) | (B) | (C) | (D) | (E) | (F) | (G) | (H) |
|---|---|---|---|---|---|---|---|---|
| Composition | | | | | | | | |
| $CH_4$ (mol %) | 94 | — | — | — | — | 1.1 | — | 2.1 |
| $C_2H_6$ (mol %) | 6 | — | — | — | — | — | — | — |
| $C_2H_8+$ (mol %) | — | — | — | — | — | — | — | — |
| $H_2$ (mol %) | — | — | — | — | — | 34.3 | — | 64.9 |
| CO (mol %) | — | — | — | — | — | 17.2 | — | 32.5 |
| $CO_2$ (mol %) | — | — | 100 | 100 | 100 | 13.8 | — | — |
| $H_2O$ (mol %) | — | 100 | — | — | — | 33.6 | 100 | 0.5 |
| Total (mol %) | 100 | 100 | 100 | 100 | 100 | 100 | 100 | 100 |
| Flow rate(kg · mol/hr) | 1000 | 3180 | 306 | 1032 | 1328 | 7475 | 2488 | 3956 |
| Temperature (° C.) | 400 | 200 | 40 | 40 | 150 | 40 | 40 | 40 |
| Pressure (kg/cm$^2$) | 20 | 20 | 0.1 | 0.1 | 20 | 15 | 0.1 | 15 |

Example 3

In this Example 3, the manufacture of a synthesis gas according to the aforementioned third Embodiment will be specifically explained with reference to FIG. 3.

A fuel (natural gas) was fed to the combustion radiation portion 12 of the reformer 10 at a flow rate of 544 kg·mol/hr and burnt together with air at the combustion radiation portion 12. Further, natural gas and steam were introduced As seen from Table 3, because of the process wherein the carbon dioxide which was recovered by means of the first and second carbon dioxide recovery devices $31_1$ and $31_2$ was added to the steam-mixed natural gas which was preliminarily reformed, and then, the resultant gas mixture was fed to the reaction tube 11 of the reformer 10, it was possible to manufacture almost the same quantity of synthesis gas having a molar ratio of $H_2/CO$=about 2 as obtained in the aforementioned first Embodiment, even if the quantity of fuel to be fed to the combustion radiation portion 12 of the reformer 10 was reduced by about 20% as compared with that of the aforementioned first Embodiment.
(Fourth Embodiment)

Figure 4:
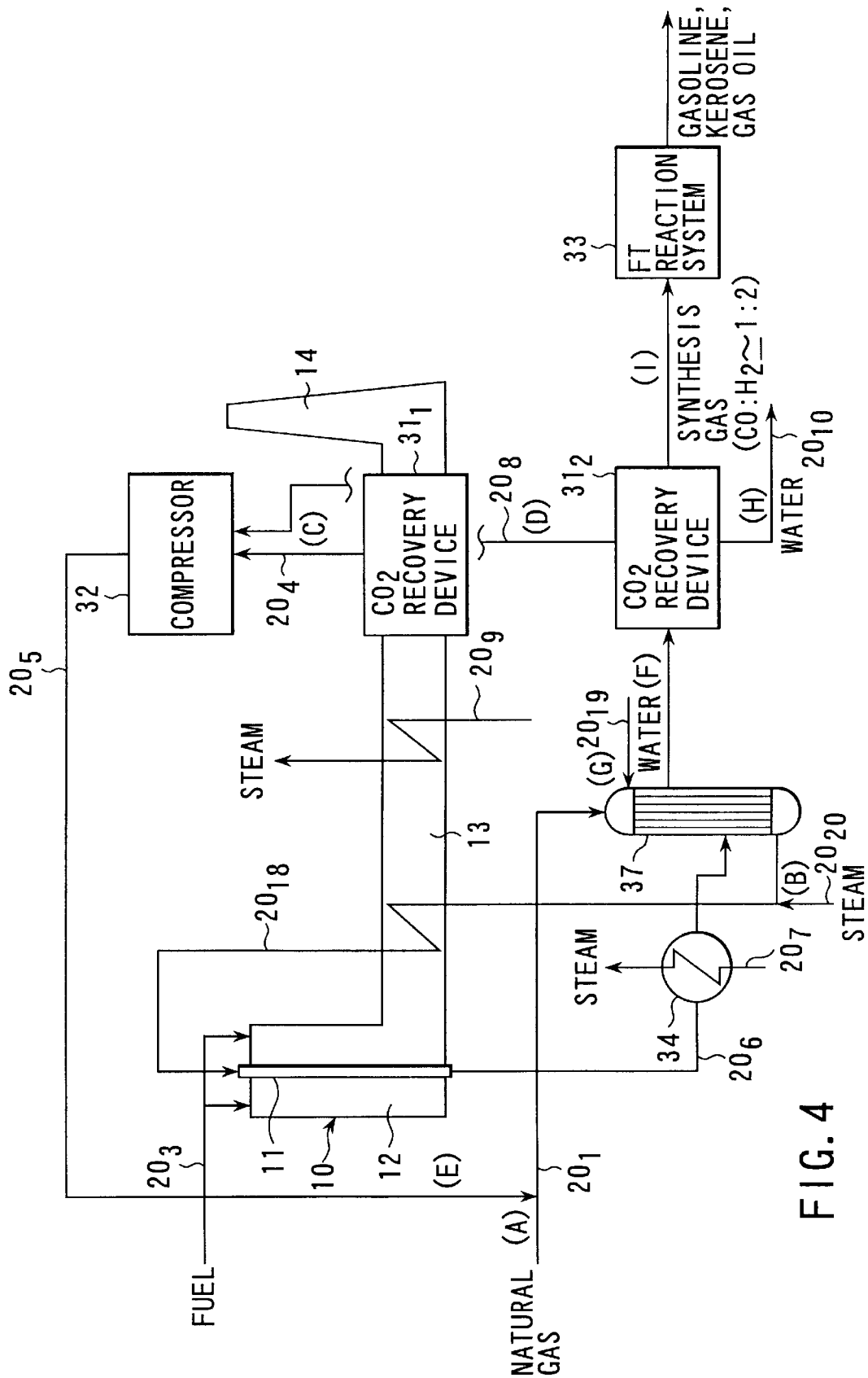
FIG. 4 is a flow chart illustrating main manufacturing steps of synthesis gas in a synthesizing plant of gasoline, kerosene and gas oil, which can be employed according to a fourth Embodiment of this invention.

FIG. 4 is a flow chart illustrating main manufacturing steps of synthesis gas in a synthesizing plant of gasoline, kerosene and gas oil, which can be employed according to the fourth Embodiment of this invention. In this FIG. 4, the same components as employed in the aforementioned FIG. 1 are identified by the same numbers, thereby omitting the explanation thereof.

This synthesizing plant is featured in that a heat exchange type moistening device 37 is disposed at a midway of the synthesis gas flow passageway $20_6$ which is located between the heat exchanger 34 and the second carbon dioxide recovery device $31_2$, both being disposed on a downstream side of the reformer 10. The raw gas-introducing passageway $20_1$ is communicated with a top portion of the moistening device 37. This moistening device 37 is communicated via the passageway $20_{18}$ with an upper end of the reaction tube 11 of the reformer 10. The passageway $20_{18}$ is communicated via the convection portion 13 of the reformer 10 with the reaction tube 11.

Next, the method of manufacturing a synthesis gas will be explained with reference to the aforementioned synthesizing plant shown in FIG. 4.

First of all, in the same manner as in the first Embodiment, a fuel for combustion is fed to the combustion radiation portion 12 of the reformer 10 so as to heat the reaction tube 11 up to a predetermined temperature. The carbon dioxide included in the combustion exhaust gas which has been generated at the combustion radiation portion 12 and cooled subsequently is recovered at the first carbon dioxide recovery device $31_1$ and then, transferred to the compressor 32.

Natural gas containing methane as a main component is fed to the raw gas-introducing passageway $20_1$. At this moment, the carbon dioxide compressed by the compressor 32 is added via the passageway $20_5$ to the natural gas at a predetermined ratio. The natural gas mixed with carbon dioxide (carbon dioxide-mixed natural gas) is allowed to flow inside the raw gas-introducing passageway $20_1$ and fed to a top portion of the moistening device 37. Water is introduced via the passageway $20_{19}$ into this top portion of the moistening device 37 to moisten the aforementioned carbon dioxide-mixed natural gas. Specifically, this carbon dioxide-mixed natural gas is allowed to contact with water that has been supplied from the passageway $20_{19}$ in the moistening device 37, thus moistening the carbon dioxide-mixed natural gas with the water, after which the carbon dioxide-mixed natural gas is heated and additionally moistened through the heat-exchange thereof with a high-temperature synthesis gas that has been supplied via the passageway $20_6$ from the reaction tube 11 of the reformer 10.

This moistened carbon dioxide-mixed natural gas is then fed via the passageway $20_{18}$ to the reaction tube 11 of the reformer 10. On this occasion, steam is supplied to a mixed gas flowing through the passageway $20_{18}$ from the passageway $20_{20}$, thereby making up the shortage in quantity of steam. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

In this reforming reaction, it is possible to manufacture a synthesis gas having a molar ratio of $H_2/CO$ ranging from 1 to 2.5 by setting the ratios among the natural gas (methane), steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating to generate a high-pressure steam. Concurrently, the synthesis gas itself is cooled and then, fed to the moistening device 37 so as to be utilized as a heating source for moistening the aforementioned carbon dioxide-mixed natural gas. The synthesis gas discharged from the moistening device 37 is transferred to the second carbon dioxide recovery device $31_2$, in which carbon dioxide included in the synthesis gas is recovered and at the same time, the water that has been concurrently produced is discharged outside the system through a passageway $20_{10}$. The carbon dioxide thus recovered is transferred via the passageway $20_8$ to the compressor 32 so as to be compressed together with the carbon dioxide that has been recovered at the first carbon dioxide recovery device $31_1$, the resultant compressed carbon dioxide being added at a predetermined ratio via the passageway $20_5$ to the steam-mixed natural gas flowing through the raw gas-introducing passageway $20_1$.

The synthesis gas from which carbon dioxide has been removed as explained above is then transferred via the passageway $20_6$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this fourth Embodiment, it is possible to manufacture a synthesis gas comprising CO and $H_2$ at a molar ratio of $H_2/CO=1$ to 2.5 in the same manner as in the case of the first Embodiment. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the moistening device 37 is disposed on an downstream side of the reformer 10 to moisten the carbon dioxide-mixed natural gas, it possible to reduce the quantity of steam to be supplied via the passageway $20_{20}$ to the carbon dioxide-mixed natural gas. As a result, the quantity of steam to be fed together with the natural gas to the reaction tube 11 of the reformer 10 can be reduced, thus making it possible to manufacture a synthesis gas at low cost.

Example 4

In this Example 4, the manufacture of a synthesis gas according to the aforementioned fourth Embodiment will be specifically explained with reference to FIG. 4.

A fuel (natural gas) was fed to the combustion radiation portion 12 of the reformer 10 at a flow rate of 625 kg·mol/hr and burnt together with air at the combustion radiation portion 12. Further, natural gas and carbon dioxide (which was recovered from the combustion exhaust gas and synthesis gas both derived from the reformer 10) were fed under the conditions shown in the following Table 4 to the moistening device 37, while steam is supplied under the conditions shown in the following Table 4 to the carbon dioxide-mixed natural gas moistened in advance and flowing through the passageway $20_{18}$. As a result, the mixed gas comprising the natural gas, steam and carbon dioxide was steam-reformed at the reaction tube 11 of the reformer 10, thereby manufacturing a synthesis gas. The composition of the synthesis gas thus obtained is shown in the Table 4.

In Table 4, the item (A) represents natural gas to be fed to the raw gas-introducing passageway $20_1$; the item (B) represents steam to be fed to the passageway $20_{18}$ through which the carbon dioxide-mixed natural gas moistened in advance was allowed to flow; the item (C) represents carbon dioxide which was recovered by means of the first carbon dioxide recovery device $31_1$ from the combustion exhaust gas generated at the combustion radiation portion 12 of the reformer 10; the item (D) represents carbon dioxide which was recovered by means of the second carbon dioxide recovery device $31_2$ from the synthesis gas; the item (E) represents carbon dioxide which was recovered by means of the first and second carbon dioxide recovery devices $31_1$ and $31_2$, this recovered carbon dioxide being subsequently introduced into the raw gas-introducing passageway $20_1$ after it was compressed by the compressor 32; the item (F) represents the synthesis gas which was manufactured at the reformer 10 so as to be transferred via the heat exchanger 34 and the moistening device 37 to the second carbon dioxide recovery device $31_2$; the item (G) represents water to be supplied to the moistening device 37; the item (H) represents water to be discharged from the second carbon dioxide recovery device $31_2$; and the item (I) represents the synthesis gas obtained after the removal of carbon dioxide by means of the second carbon dioxide recovery device $31_2$, the synthesis gas being subsequently fed to the FT reaction system 33. These items (A) to (I) are also shown in FIG. 4.

fed to the combustion radiation portion 12 of the reformer 10 was reduced by about ⅓ as compared with that of the aforementioned first Embodiment.

(Fifth Embodiment)

Figure 5:
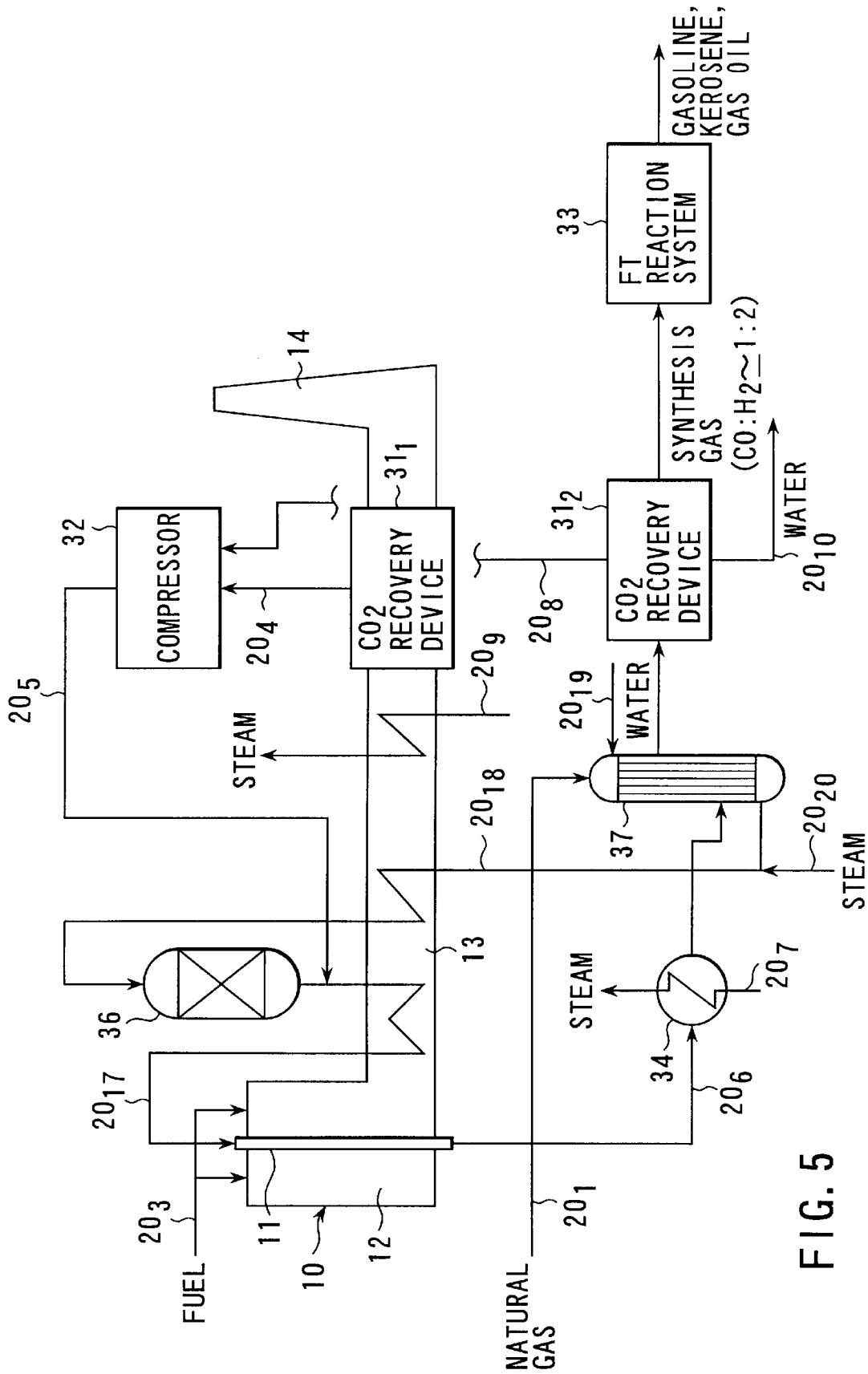
FIG. 5 is a flow chart illustrating main manufacturing steps of synthesis gas in a synthesizing plant of gasoline, kerosene and gas oil, which can be employed according to a fifth Embodiment of this invention.

FIG. 5 is a flow chart illustrating main manufacturing steps of synthesis gas in a synthesizing plant of gasoline, kerosene and gas oil, which can be employed according to the fifth Embodiment of this invention. In this FIG. 5, the same components as employed in the aforementioned FIG. 1 are identified by the same numbers, thereby omitting the explanation thereof.

This synthesizing plant is featured in that a heat exchange type moistening device 37 is disposed at a midway of the synthesis gas flow passageway $20_6$ which is located between the heat exchanger 34 and the second carbon dioxide recovery device $31_2$, both being disposed on a downstream side of the reformer 10. The raw gas-introducing passageway $20_1$ is communicated with a top portion of the moistening device 37. This moistening device 37 is communicated via the passageway $20_{18}$ with a top portion of the preliminary reformer 36 located on an upstream side of the reformer 10. This preliminary reformer 36 is communicated via the passageway $20_{17}$ with an upper end of the reaction tube 11 of the reformer 10. The passageway $20_{17}$ is communicated via the convection portion 13 of the reformer 10 with the reaction tube 11. The compressor 32 is communicated via the passageway $20_5$ with the passageway $20_{17}$ which is disposed to connect the preliminary reformer 36 with the reformer 10.

Next, the method of manufacturing a synthesis gas will be explained with reference to the aforementioned synthesizing plant shown in FIG. 5.

Natural gas containing methane as a main component is fed via the raw gas-introducing passageway $20_1$ to a top portion of the moistening device 37. The natural gas is moistened by feeding water via the passageway $20_{19}$ to a top portion of the moistening device 37. Specifically, the natural gas is allowed to contact with water supplied from the passageway $20_{19}$ at the moistening device 37, and the resultant moistened natural gas is then heat-exchanged with

TABLE 4

| Item | (A) | (B) | (C) | (D) | (E) | (F) | (G) | (H) | (I) |
|---|---|---|---|---|---|---|---|---|---|
| Composition | | | | | | | | | |
| $CH_4$ (mol %) | 94 | — | — | — | — | 1.1 | — | — | 2.1 |
| $C_2H_6$ (mol %) | 6 | — | — | — | — | — | — | — | — |
| $C_2H_8+$ (mol %) | — | — | — | — | — | — | — | — | — |
| $H_2$ (mol %) | — | — | — | — | — | 34.3 | — | — | 64.9 |
| CO (mol %) | — | — | — | — | — | 17.2 | — | — | 32.5 |
| $CO_2$ (mol %) | — | — | 100 | 100 | 100 | 13.8 | — | — | — |
| $H_2O$ (mol %) | — | 100 | — | — | — | 33.6 | 100 | 100 | 0.5 |
| Total (mol %) | 100 | 100 | 100 | 100 | 100 | 100 | 100 | 100 | 100 |
| Flow rate(kg · mol/hr) | 1000 | 1029 | 306 | 1032 | 1338 | 7475 | 2151 | 2488 | 3956 |
| Temperature (° C.) | 400 | 200 | 40 | 40 | 150 | 40 | 40 | 40 | 40 |
| Pressure (kg/cm²) | 20 | 20 | 0.1 | 0.1 | 20 | 15 | 20 | 0.1 | 15 |

As seen from Table 4, because of the process wherein the carbon dioxide which was recovered by means of the first and second carbon dioxide recovery devices $31_1$ and $31_2$ was added to the natural gas, and then, the resultant gas mixture was fed to the reaction tube 11 of the reformer 10 through the moistening device 37, it was possible to manufacture almost the same quantity of synthesis gas having a molar ratio of $H_2/CO$=about 2 as obtained in the aforementioned first Embodiment, even if the quantity of steam to be a high-temperature synthesis gas that has been supplied via the passageway $20_6$ from the reaction tube 11 of the reformer 10, thereby enabling the natural gas to be further humidified.

The natural gas moistened in this manner is then transferred via the passageway $20_{18}$ to the preliminary reformer 36. On this occasion, steam is supplied to the natural gas flowing through the passageway $20_{18}$ from the passageway $20_{20}$, thereby making up the shortage in quantity of steam. Further, this moistened steam-mixed natural gas is allowed to pass through the passageway $20_{18}$ and heated (preliminarily heated) as the natural gas passes through the convection portion 13 of the reformer 10. In the aforementioned preliminary reformer 36, the hydrocarbons of the natural gas which have two or more carbon atoms, mainly ethane, are reformed into methane having one carbon atom, CO and $H_2$.

The steam-mixed natural gas preliminarily reformed in this manner is then fed via the passageway $20_{17}$ to the reaction tube 11 of the reformer 10. On this occasion, the carbon dioxide that has been compressed by the compressor 32 is fed at a predetermined ratio via the passageway $20_5$ to the steam-mixed natural gas reformed preliminarily as mentioned above and flowing through the passageway $20_{17}$. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

In this reforming reaction, it is possible to manufacture a synthesis gas having a molar ratio of $H_2/CO$ ranging from 1 to 2.5 by setting the ratios among the natural gas (methane), steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam. Concurrently, the synthesis gas itself is cooled and then, fed to the moistening device 37 so as to be utilized as a heating source for moistening the aforementioned carbon dioxide-mixed natural gas. The synthesis gas discharged from the moistening device 37 is transferred to the second carbon dioxide recovery device $31_2$, in which carbon dioxide included in the synthesis gas is recovered and at the same time, the water that has been concurrently produced is discharged outside the system through a passageway $20_{10}$. The carbon dioxide thus recovered is transferred via the passageway $20_8$ to the compressor 32 so as to be compressed together with the carbon dioxide that has been recovered at the first carbon dioxide recovery device $31_1$, the resultant compressed carbon dioxide being added at a predetermined ratio via the passageway $20_5$ to the preliminarily reformed steam-mixed natural gas flowing through the raw gas-introducing passageway $20_{17}$.

The synthesis gas from which carbon dioxide has been removed as explained above is then transferred via the passageway $20_6$ to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil.

According to this fifth Embodiment, it is possible to manufacture a synthesis gas having a molar ratio of $H_2/CO=1$ to 2.5 in the same manner as in the case of the first Embodiment. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the preliminary reformer 36 is disposed on an upstream side of the reformer 10 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 10. As a result, the quantity of fuel to be fed to the combustion radiation portion 12 of the reformer 10 can be reduced, thus making it possible to manufacture a synthesis gas at low cost.

Moreover, since the moistening device 37 is disposed on an downstream side of the reformer 10 to moisten the natural gas, it possible to reduce the quantity of steam to be supplied via the passageway $20_{20}$ to the natural gas. As a result, the quantity of steam to be fed together with the natural gas to the reaction tube 11 of the reformer 10 can be reduced, thus making it possible to manufacture a synthesis gas at low cost.

By the way, in all of the foregoing embodiments according to third to fifth Embodiments, the first and second carbon dioxide absorption towers both housing the same kind of carbon dioxide absorption solution and a single carbon dioxide recovery device, which are employed in the aforementioned second Embodiment, may be substituted for the first and second carbon dioxide recovery devices employed in these third to fifth Embodiments for the manufacture of the synthesis gas.

(Sixth Embodiment)

Figure 6:
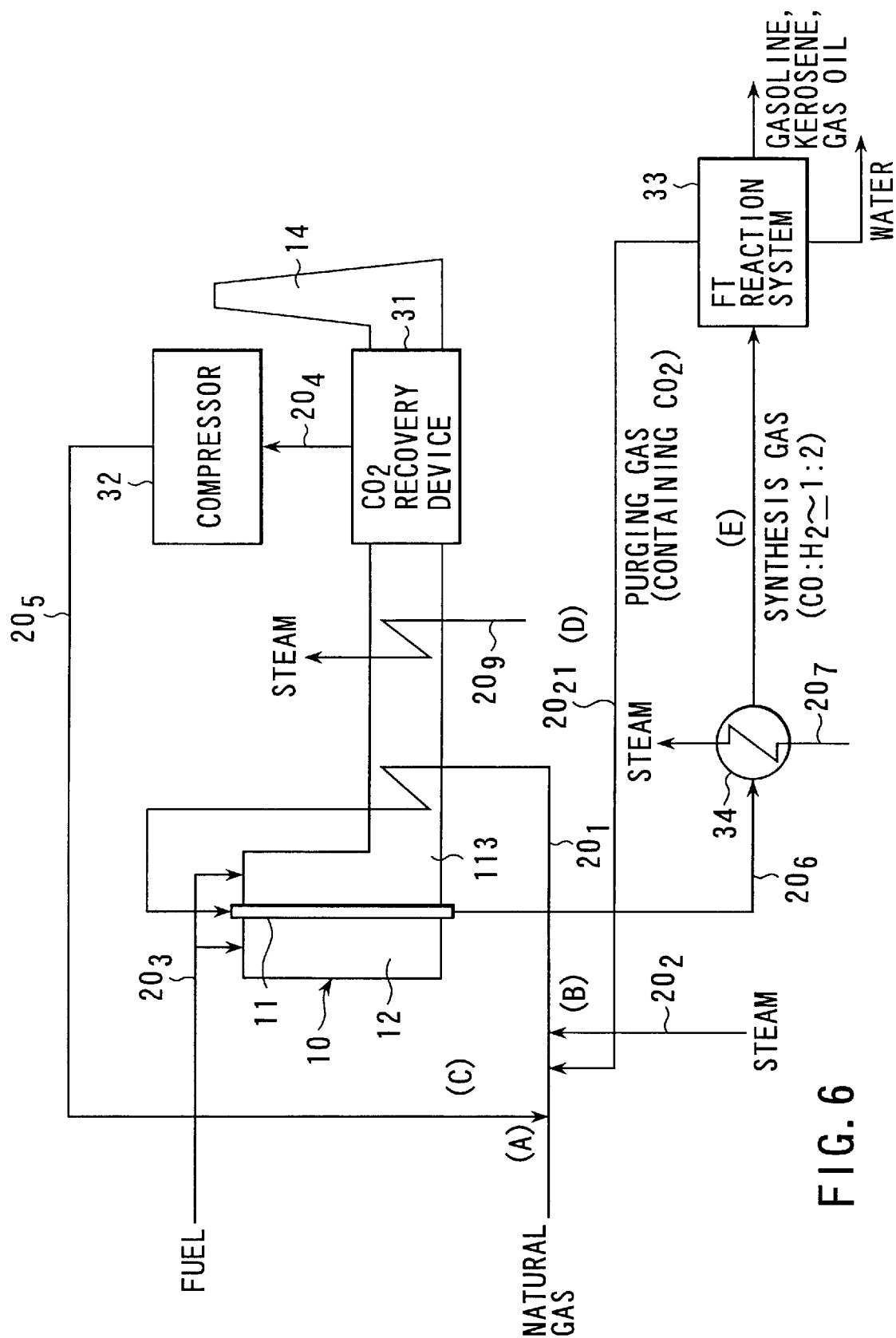
FIG. 6 is a flow chart illustrating main manufacturing steps of synthesis gas in a synthesizing plant of gasoline, kerosene and gas oil, which can be employed according to a sixth Embodiment of this invention.

FIG. 6 is a flow chart illustrating main manufacturing steps of synthesis gas in a synthesizing plant of gasoline, kerosene and gas oil, which can be employed according to the sixth Embodiment of this invention.

Referring to FIG. 6, a reformer 10 comprises a reaction tube 11 adapted to be employed for steam reforming, a combustion radiation portion 12 disposed around the reaction tube 11, and a chimney 14 which is communicated via a convection portion (waste heat recovering portion) 13 with the combustion radiation portion 12. The reaction tube 11 is filled therein with a nickel-based catalyst for instance.

A raw gas-introducing passageway $20_1$ is communicated via a convection portion 13 of the reformer 10 with an upper end of the reaction tube 11. This raw gas-introducing passageway $20_1$ may be provided with a desulfurizer (not shown). A steam-introducing passageway $20_2$ is communicated with the raw gas-introducing passageway $20_1$ which is positioned on an upstream side of the convection portion 13. A fuel-introducing passageway $20_3$ is communicated with the combustion radiation portion 12 of the reformer 10.

A carbon dioxide recovery device 31 is disposed at the convection portion 13 of the reformer 10 so as to enable it to recover carbon dioxide from the combustion exhaust gas existing in the convection portion 13. This carbon dioxide recovery device 31 is communicated via a passageway $20_4$ with a compressor 32. This compressor 32 is communicated via a passageway $20_5$ with the raw gas-introducing passageway $20_1$ which is positioned on an upstream side of the reformer 10.

A synthesis gas flow passageway $20_6$ is communicated via one end thereof with a lower end of the reaction tube 11 of the reformer 10 and also communicated via the other end thereof with the Fisher-Tropsch (FT) reaction system 33 which is filled with a cobalt-based catalyst for instance. This FT reaction system 33 is communicated, via a purging gas flow passageway $20_{21}$ for feeding a purging gas, with the raw gas-introducing passageway $20_1$ which is located on an upstream side of the reformer 10. By the way, the catalyst to be filled in this FT reaction system 33 may not be confined to the cobalt-based catalyst but may be an iron-based catalyst for instance. A heat exchanger 34 is disposed at a midway of the synthesis gas flow passageway $20_6$. The heat exchanger 34 is intersected with a passageway $20_7$ so as to heat for example a boiler water passing through this passageway $20_7$, thereby generating a high-pressure steam. By the way, a passageway $20_9$ for flowing a boiler water for instance is intersected with the convection portion 13 of the reformer 10 so as to allow the combustion exhaust gas of the convection portion 13 to be heat-exchanged with the aforementioned boiler water, thereby cooling the combustion exhaust gas and at the same time, heating the boiler water to generate a high-pressure steam.

Next, the method of manufacturing a synthesis gas will be explained with reference to the aforementioned synthesizing plant shown in FIG. 6.

First of all, a fuel for combustion is fed via the fuel-introducing passageway $20_3$ to the combustion radiation portion 12 of the reformer 10 so as to allow the fuel to burn together with air, thereby heating the reaction tube 11 up to a predetermined temperature. The combustion exhaust gas containing carbon dioxide and generated at this combustion radiation portion 12 is allowed to flow via the convection portion 13 into the chimney 14. The combustion exhaust gas is heat-exchanged with the natural gas passing through the raw gas-introducing passageway $20_1$ as well as with the boiler water passing through the passageway $20_9$ as the combustion exhaust gas passes through the convection portion 13, thereby cooling the combustion exhaust gas. The carbon dioxide in the combustion exhaust gas that has been cooled in this manner is recovered by the carbon dioxide recovery device 31 and then, transferred via the passageway $20_4$ to the compressor 32. The combustion exhaust gas from which carbon dioxide has been removed is then allowed to be released to air atmosphere through the chimney 14.

Natural gas containing methane as a main component is fed to the raw gas-introducing passageway $20_1$. At this moment, the carbon dioxide that has been pressurized by the compressor 32 is added via the passageway $20_5$ to the natural gas at a predetermined ratio. Further, steam is also added via the steam-introducing passageway $20_2$ to the natural gas at a predetermined ratio. By the way, as for this steam, the steam that has been generated through a heat exchange between the boiler water and the synthesis gas at the heat exchanger 34 as well as the steam that has been generated through a heat exchange between the boiler water and the combustion exhaust gas at the convection portion 13 of reformer 10 can be utilized.

The natural gas mixed with carbon dioxide and steam is allowed to flow inside the raw gas-introducing passageway $20_1$ and heated (preliminarily heated) as the aforementioned mixed natural gas passes through the convection portion 13 of reformer 10. Thereafter, this mixed natural gas is fed to the reaction tube 11. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

According to the aforementioned reforming reaction, it is possible to manufacture a synthesis gas having a molar ratio of $H_2/CO$ ranging from 1 to 2.5 by setting the ratios among the natural gas, steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam. Concurrently, the synthesis gas itself is cooled and then, fed to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil. Additionally, in this synthesizing reaction, a purging gas containing carbon dioxide and unreacted natural gas is caused to generate. This purging gas is then added, via the passageway $20_{21}$, as a carbon dioxide source to the natural gas existing inside the raw gas-introducing passageway $20_1$.

According to this sixth Embodiment, on the occasion of performing the reforming reaction of steam-mixed natural gas by feeding the steam-mixed natural gas via the raw gas-introducing passageway $20_1$ to the reaction tube 11 of the reformer 10, the combustion radiation portion 12 is provided for the purpose of heating the reaction tube 11 of the reformer 10 because of the fact that the reforming reaction is an endothermic reaction. Further, the combustion exhaust gas discharged from the combustion radiation portion 12 is cooled, and then, the carbon dioxide contained in the combustion exhaust gas is recovered at the carbon dioxide recovery device 31 and compressed at the compressor 32, the resultant compressed carbon dioxide being transferred via the passageway $20_5$ to the raw gas-introducing passageway $20_1$ disposed on an upstream side of the reformer 10 so as to be added to the natural gas flowing through the raw gas-introducing passageway $20_1$. Additionally, the purging gas containing carbon dioxide that has been generated in the Fisher-Tropsch (FT) reaction system 33 is added via the passageway $20_{21}$ to the natural gas existing inside the raw gas-introducing passageway $20_1$.

By feeding carbon dioxide to the steam-mixed natural gas in this manner, it is possible to manufacture a synthesis gas comprising CO and $H_2$ at a molar ratio of $H_2/CO=1$ to 2.5. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Therefore, since it is possible to procure carbon dioxide inside the manufacturing plant (mainly the reformer) of synthesis gas which includes the Fisher-Tropsch reaction system without depending on a separate carbon dioxide source, a synthesis gas comprising hydrogen gas and carbon monoxide at a molar ratio of $H_2/CO$ which is suited for synthesizing gasoline, kerosene and gas oil by way of the Fisher-Tropsch reaction system can be cheaply manufactured at any place without being restricted by the location of $CO_2$ gas source such as an ammonia plant.

Further, since the purging gas containing carbon dioxide that has been generated in the Fisher-Tropsch reaction system 33 is supplied as a carbon dioxide source to the natural gas, it is no more required to install a separate carbon dioxide recovery device for recovering carbon dioxide included in the synthesis gas as required in the case of any of the aforementioned first to fifth Embodiments, thereby making it possible to manufacture the synthesis gas and to synthesize gasoline, kerosene and gas oil by making use of a cheap plant.

Example 5

In this Example 5, the manufacture of a synthesis gas according to the aforementioned first Embodiment will be specifically explained with reference to FIG. 6.

A fuel (natural gas) was fed to the combustion radiation portion 12 of the reformer 10 at a flow rate of 625 kg·mol/hr and burnt together with air at the combustion radiation portion 12. Further, natural gas, steam and carbon dioxide (which was recovered from the combustion exhaust gas of the reformer 10 and the purging gas generated at the Fisher-Tropsch reaction system 33) were introduced into the raw gas-introducing passageway $20_1$ under the conditions shown in the following Table 5 and then, subjected to steam reforming at the reaction tube 11 of the reformer 10, thereby manufacturing a synthesis gas. The composition of the synthesis gas thus obtained is shown in the Table 5.

In Table 5, the item (A) represents natural gas to be fed to the raw gas-introducing passageway $20_1$; the item (B) represents steam to be fed to the raw gas-introducing passageway $20_1$; the item (C) represents carbon dioxide which was recovered at the carbon dioxide recovery device 31, the recovered carbon dioxide being subsequently compressed by the compressor 32 before it was transferred to the raw gas-introducing passageway $20_1$; the item (D) represents the purging gas which was generated in the Fisher-Tropsch reaction system 33; and the item (E) represents the synthesis gas manufactured at the reformer 10, the synthesis gas being subsequently fed via the heat exchanger 34 to the Fisher-Tropsch reaction system 33. These items (A) to (E) are also shown in FIG. 6.

TABLE 5

| Item | (A) | (B) | (C) | (D) | (E) |
|---|---|---|---|---|---|
| Composition | | | | | |
| $CH_4$ (mol %) | 94 | — | — | 10.9 | 1.4 |
| $C_2H_6$ (mol %) | 6 | — | — | 0.3 | — |
| $C_2H_8+$ (mol %) | — | — | — | — | — |
| $H_2$ (mol %) | — | — | — | 21.2 | 36.9 |
| CO (mol %) | — | — | — | 10.7 | 18.0 |
| $CO_2$ (mol %) | — | — | 100 | 56.9 | 13.8 |
| $H_2O$ (mol %) | — | 100 | — | — | 31.6 |
| Total (mol %) | 100 | 100 | 100 | 100 | 100 |
| Flow rate(kg · mol/hr) | 1000 | 3981 | 361 | 2333 | 10038 |

TABLE 5-continued

| Item | (A) | (B) | (C) | (D) | (E) |
|---|---|---|---|---|---|
| Temperature (° C.) | 400 | 200 | 150 | 150 | 40 |
| Pressure (kg/cm²) | 20 | 20 | 20 | 25 | 15 |

As seen from Table 5, it was possible to manufacture a synthesis gas having a molar ratio of $H_2/CO$=about 2 by feed a mixed gas to the reaction tube 11 of the reformer 10 wherein the mixed gas was obtained by adding the carbon dioxide which was recovered by means of the carbon dioxide recovery devices 31 to the steam-mixed natural gas, and at the same time, by adding the carbon dioxide-mixed gas generated at the Fisher-Tropsch reaction system 33 to the steam-mixed natural gas.

(Seventh Embodiment)

Figure 7:
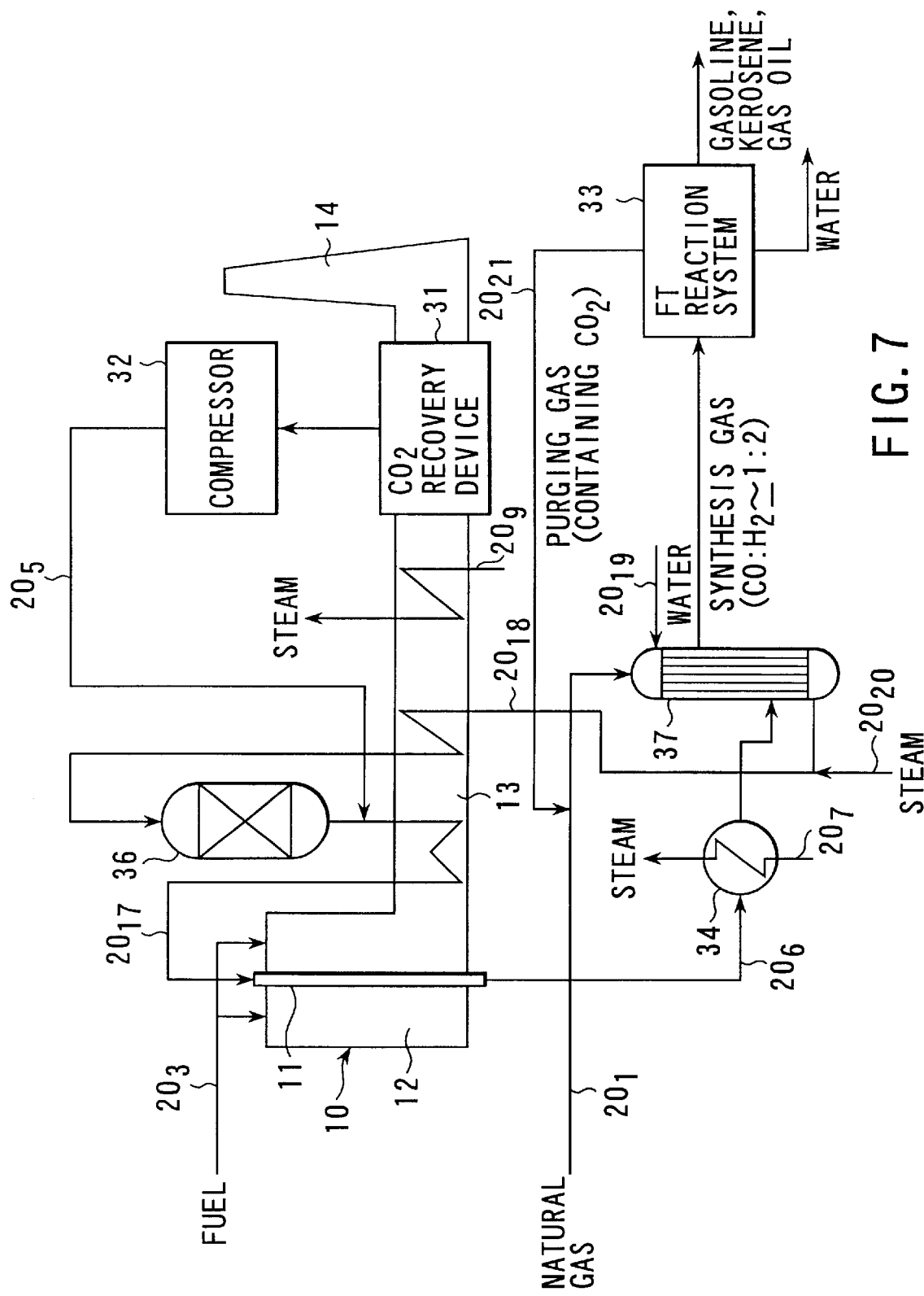
FIG. 7 is a flow chart illustrating main manufacturing steps of synthesis gas in a synthesizing plant of gasoline, kerosene and gas oil, which can be employed according to a seventh Embodiment of this invention.

FIG. 7 is a flow chart illustrating main manufacturing steps of synthesis gas in a synthesizing plant of gasoline, kerosene and gas oil, which can be employed according to the seventh Embodiment of this invention. In this FIG. 7, the same components as employed in the aforementioned FIG. 6 are identified by the same numbers, thereby omitting the explanation thereof.

This synthesizing plant is featured in that a heat exchange type moistening device 37 is disposed at a midway of the synthesis gas flow passageway $20_6$ which is located between the heat exchanger 34 and the Fisher-Tropsch reaction system 33, both being disposed on a downstream side of the reformer 10. The raw gas-introducing passageway $20_1$ is communicated with a top portion of the moistening device 37. This moistening device 37 is communicated via the passageway $20_{18}$ with a top portion of the preliminary reformer 36 located on an upstream side of the reformer 10. This preliminary reformer 36 is communicated via the passageway $20_{17}$ with an upper end of the reaction tube 11 of the reformer 10. The passageway $20_{17}$ is communicated via the convection portion 13 of the reformer 10 with the reaction tube 11. The compressor 32 is communicated via the passageway $20_5$ with the passageway $20_{17}$ which is disposed to connect the preliminary reformer 36 with the reformer 10. The FT reaction system 33 is communicated, via the passageway $20_{21}$ which is designed to feed the purging gas, with the raw gas-introducing passageway $20_1$.

Next, the method of manufacturing a synthesis gas will be explained with reference to the aforementioned synthesizing plant shown in FIG. 7.

First of all, in the same manner as in the sixth Embodiment, a fuel for combustion is fed to the combustion radiation portion 12 of the reformer 10 so as to heat the reaction tube 11 up to a predetermined temperature. The carbon dioxide included in the combustion exhaust gas which has been generated at the combustion radiation portion 12 and cooled subsequently is recovered at the carbon dioxide recovery device 31 and then, transferred to the compressor 32.

Natural gas containing methane as a main component is fed via the raw gas-introducing passageway $20_1$ to a top portion of the moistening device 37. The natural gas is moistened by feeding water via the passageway $20_{19}$ to a top portion of the moistening device 37. Specifically, the natural gas is allowed to contact with water supplied from the passageway $20_{19}$ at the moistening device 37, and the resultant moistened natural gas is then heat-exchanged with a high-temperature synthesis gas that has been supplied via the passageway $20_6$ from the reaction tube 11 of the reformer 10, thereby enabling the natural gas to be further moistened.

The natural gas moistened in this manner is then transferred via the passageway $20_{18}$ to the preliminary reformer 36. On this occasion, steam is supplied to the natural gas flowing through the passageway $20_{18}$ from the passageway $20_{20}$, thereby making up the shortage in quantity of steam. Further, this moistened steam-mixed natural gas is allowed to pass through the passageway $20_{18}$ and heated (preliminarily heated) as the natural gas passes through the convection portion 13 of the reformer 10. In the aforementioned preliminary reformer 36, the hydrocarbons of the natural gas which have two or more carbon atoms, mainly ethane, as well as the hydrocarbons included in the purging gas to be obtained from the Fisher-Tropsch reaction system 33 (to be explained hereinafter) and having two or more carbon atoms are reformed into methane having one carbon atom, CO and $H_2$.

The steam-mixed natural gas preliminarily reformed in this manner is then fed via the passageway $20_{17}$ to the reaction tube 11 of the reformer 10. On this occasion, the carbon dioxide that has been compressed by the compressor 32 is fed at a predetermined ratio via the passageway $20_5$ to the steam-mixed natural gas reformed preliminarily as mentioned above and flowing through the passageway $20_{17}$. The mixed gas comprising natural gas containing methane ($CH_4$) as a main component, steam and carbon dioxide, which has been fed to the reaction tube 11 of the reformer 10 is then subjected to steam reforming wherein mainly methane is steam-reformed under the presence of a catalyst filled into the reaction tube 11, thereby converting the mixed gas into a synthesis gas containing hydrogen gas, carbon monoxide and carbon dioxide according to the aforementioned formulas (1) and (2).

In this reforming reaction, it is possible to manufacture a synthesis gas having a molar ratio of $H_2/CO$ ranging from 1 to 2.5 by setting the ratios among the natural gas (methane), steam and carbon dioxide to such that the ratio between methane ($CH_4$) and stream ($H_2O$) is $CH_4:H_2O=1:1.5$ to 1:3; while the ratio between methane ($CH_4$) and carbon dioxide ($CO_2$) is $CH_4:CO_2=1:1$ to 1:3 on the occasion of adding steam and carbon dioxide to the natural gas.

By the way, since the aforementioned reforming reaction is an endothermic reaction, it is required to burn the fuel gas together with air at the combustion radiation portion 12 of the reformer 10 as mentioned above so as to heat the interior of the reaction tube 11 up to 850 to 900° C. for instance.

The synthesis gas thus obtained is fed via the synthesis gas flow passageway $20_6$ to the heat exchanger 34 to heat the boiler water flowing through the passageway $20_7$, thereby generating a high-pressure steam. Concurrently, the synthesis gas itself is cooled and then, fed to the moistening device 37 so as to be utilized as a heating source for moistening the aforementioned carbon dioxide-mixed natural gas. The synthesis gas discharged from the moistening device 37 is transferred to the Fisher-Tropsch (FT) reaction system 33 which is filled with a cobalt-based catalyst for instance, thereby allowing the hydrogen and carbon monoxide all included in the synthesis gas to react with each other, thus synthesizing gasoline, kerosene and gas oil. Additionally, in this synthesizing reaction, a purging gas containing carbon dioxide and unreacted natural gas is caused to generate. This purging gas is then added, via the passageway $20_{21}$, as a carbon dioxide source to the natural gas existing inside the raw gas-introducing passageway $20_1$. By the way, the hydrocarbons included in the purging gas and having two or more carbon atoms are reformed at the preliminary reformer 36 into methane having one carbon atom, CO and $H_2$.

According to this seventh Embodiment, it is possible to manufacture a synthesis gas having a molar ratio of $H_2/CO=1$ to 2.5 in the same manner as in the case of the sixth Embodiment. This synthesis gas having such a molar ratio of $H_2/CO$ is then transferred to the Fisher-Tropsch (FT) reaction system 33 which is filled with a cobalt-based catalyst for instance, thereby allowing the hydrogen and carbon monoxide all included in the synthesis gas to react with each other, thus making it possible to synthesize gasoline, kerosene and gas oil.

Further, since the purging gas containing carbon dioxide that has been generated in the Fisher-Tropsch reaction system 33 is supplied as a carbon dioxide source to the natural gas, it is no more required to install a separate carbon dioxide recovery device for recovering carbon dioxide included in the synthesis gas as required in the case of any of the aforementioned first to fifth Embodiments, thereby making it possible to manufacture the synthesis gas and to synthesize gasoline, kerosene and gas oil by making use of a cheap plant.

Additionally, since the preliminary reformer 36 is disposed on an upstream side of the reformer 10 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 10. As a result, the quantity of fuel to be fed to the combustion radiation portion 12 of the reformer 10 can be reduced, thus making it possible to manufacture a synthesis gas with a decreased quantity of fuel.

Moreover, since the moistening device 37 is disposed on an downstream side of the reformer 10 to moisten the natural gas, it possible to reduce the quantity of steam to be supplied via the passageway $20_{20}$ to the natural gas. As a result, the quantity of steam to be fed together with the natural gas to the reaction tube 11 of the reformer 10 can be reduced, thus making it possible to manufacture a synthesis gas at low cost.

By the way, it is possible in this seventh Embodiment to omit either the moistening device or the preliminary reformer. In the former case (where the moistening device is omitted), steam is fed to the raw gas-introducing passageway $20_1$ where the natural gas is flowing, and the resultant steam-mixed natural gas is directly supplied via the raw gas-introducing passageway $20_1$ to the preliminary reformer 36. In the latter case (where the preliminary reformer is omitted), carbon dioxide which has been recovered at the carbon dioxide recovery device 31 and then compressed by means of the compressor 32 is fed to the raw gas-introducing passageway $20_1$ where the natural gas is flowing, and the resultant carbon dioxide-mixed natural gas is transferred via the raw gas-introducing passageway $20_1$ to the moistening device 37 to thereby humidify the carbon dioxide-mixed natural gas. However, in either cases, the purging gas containing carbon dioxide that has been generated at the Fisher-Tropsch reaction system 33 is employed as a carbon dioxide source and sent to the raw gas-introducing passageway $20_1$ where the natural gas flows.

(Eighth Embodiment)

Figure 8:
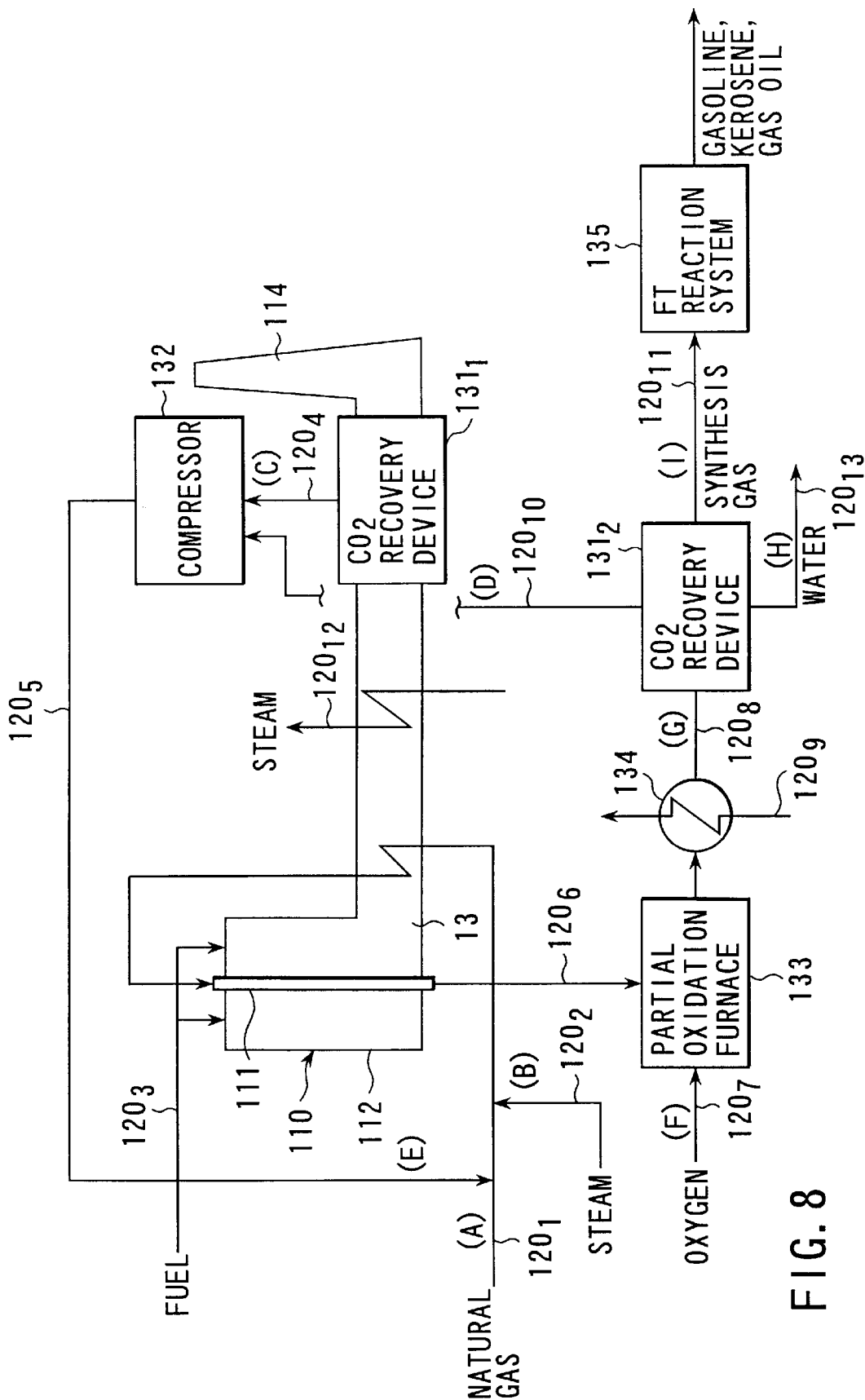
FIG. 8 is a flow chart illustrating main manufacturing steps of synthesis gas in a synthesizing plant of gasoline, kerosene and gas oil, which can be employed according to an eighth Embodiment of this invention.

FIG. 8 is a flow chart illustrating main manufacturing steps of synthesis gas in a synthesizing plant of gasoline, kerosene and gas oil, which can be employed according to the eighth Embodiment of this invention.

Referring to FIG. 8, a reformer 110 comprises a reaction tube 111 adapted to be employed for steam reforming, a combustion radiation portion 112 disposed around the reaction tube 111, and a chimney 114 which is communicated via a convection portion (waste heat recovering portion) 113 with the combustion radiation portion 112. The reaction tube 111 is filled therein with a nickel-based catalyst for instance.

A fuel-introducing passageway $120_3$ is communicated with the combustion radiation portion 112 of the reformer 110.

A raw gas-introducing passageway $120_1$ is communicated via a convection portion 113 of the reformer 110 with an upper end of the reaction tube 111. This raw gas-introducing passageway $120_1$ may be provided with a desulfurizer (not shown). A steam-introducing passageway $120_2$ is communicated with the raw gas-introducing passageway $120_1$ which is positioned on an upstream side of the convection portion 113.

A first carbon dioxide recovery device $131_1$ is disposed at the convection portion 113 of the reformer 110 so as to enable it to recover carbon dioxide from the combustion exhaust gas existing in the convection portion 113. This first carbon dioxide recovery device $131_1$ is communicated via a passageway $120_4$ with a compressor 132. This compressor 132 is communicated via a passageway $120_5$ with the raw gas-introducing passageway $120_1$ which is positioned on an upstream side of the reformer 110.

The lower end of the reaction tube 111 of reformer 110 is communicated via the synthesis gas flow passageway $120_6$ with a partial oxidation furnace 133. An oxygen introducing passageway $120_7$ is communicated with this partial oxidation furnace 133. This partial oxidation furnace 133 is communicated via the passageway $120_8$ with a second carbon dioxide recovery device $131_2$. By the way, a heat exchanger 134 is disposed at a midway of the passageway $120_8$. The heat exchanger 134 is intersected with the passageway $120_9$ so as to heat for example a boiler water passing through this passageway $120_9$, thereby generating a high-pressure steam. The second carbon dioxide recovery device $131_2$ is communicated via a passageway $120_{10}$ with the compressor 132. The second carbon dioxide recovery device $131_2$ is communicated via a passageway $120_{11}$ with the Fisher-Tropsch (FT) reaction system 135 which is filled with a cobalt-based catalyst for instance. By the way, the catalyst to be filled in this FT reaction system 135 may not be confined to the cobalt-based catalyst but may be an iron-based catalyst for instance.

A passageway $120_{12}$ for flowing a boiler water for instance is intersected with the convection portion 113 of the reformer 110 so as to allow the combustion exhaust gas of the convection portion 113 to be heat-exchanged with the aforementioned boiler water, thereby cooling the combustion exhaust gas and at the same time, heating the boiler water to generate a high-pressure steam.

Next, the method of manufacturing a synthesis gas will be explained with reference to the aforementioned synthesizing plant shown in FIG. 8.

First of all, a fuel for combustion is fed via the fuel-introducing passageway $120_3$ to the combustion radiation portion 112 of the reformer 110 so as to allow the fuel to burn together with air, thereby heating the reaction tube 111 up to a sufficiently high temperature (for example, 850 to 900° C.). The combustion exhaust gas containing carbon dioxide and generated at this combustion radiation portion 112 is allowed to flow via the convection portion 113 into the chimney 114. The combustion exhaust gas is heat-exchanged with the natural gas passing through the raw gas-introducing passageway $120_1$ as well as with the boiler water passing through the passageway $120_{12}$ as the combustion exhaust gas passes through the convection portion 113, thereby cooling the combustion exhaust gas. The carbon dioxide in the combustion exhaust gas that has been cooled in this manner is recovered by the first carbon dioxide recovery device $131_1$ and then, transferred via the passageway $120_4$ to the compressor 132. The cooled combustion exhaust gas from which carbon dioxide has been removed is then allowed to be released to air atmosphere through the chimney 114.

Natural gas containing methane as a main component is fed to the raw gas-introducing passageway $120_1$. At this moment, the carbon dioxide that has been pressurized by the compressor 132 is added via the passageway $120_5$ to the natural gas at a predetermined ratio. Further, steam is also added via the steam-introducing passageway $120_2$ to the natural gas at a predetermined ratio. On the occasion of adding these steam and carbon dioxide to the natural gas, the molar ratios of these steam and carbon dioxide to the natural gas should preferably be set such that the ratio between methane ($CH_4$) and stream ($H_2O$) is 1:1.5 to 1:3; while the ratio between methane ($CH_4$) and carbon dioxide ($CO_2$) is 1:0.5 to 1:2. By the way, as for this steam, the steam that has been generated through a heat exchange between the boiler water and the synthesis gas at the heat exchanger 134 as well as the steam that has been generated through a heat exchange between the boiler water and the combustion exhaust gas at the convection portion 113 of reformer 110 can be utilized.

The natural gas mixed with carbon dioxide and steam is allowed to flow inside the raw gas-introducing passageway $120_1$ and heated (preliminarily heated) as the aforementioned mixed natural gas passes through the convection portion 113 of reformer 110. Thereafter, this mixed natural gas is fed to the reaction tube 111. The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

In these formulas (1) and (2) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of the reaction tube 111 can be obtained.

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO$=1 to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the second carbon dioxide recovery device $131_2$, in which carbon dioxide included in the synthesis gas is recovered and at the same time, the water that has been concurrently produced is discharged outside the system through a passageway $120_{13}$. The carbon dioxide thus recovered is transferred via the passageway $120_{10}$ to the compressor 132 so as to be compressed together with the carbon dioxide that has been recovered at the first carbon dioxide recovery device $131_1$, the resultant compressed carbon dioxide being transferred via the passageway $120_5$ to the raw gas-introducing passageway $120_1$ and added to the natural gas existing in the raw gas-introducing passageway $120_1$.

The synthesis gas from which carbon dioxide has been removed in this manner is then transferred via the passageway $120_{11}$ to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

According to this eighth Embodiment, the reformer 110 is constituted by the reaction tube 111 and the combustion radiation portion 112 which is designed to heat the reaction tube 111 through a combustion between a fuel and air, thereby enabling the interior of the reaction tube 111 to be heated up to a sufficiently high temperature (for example, 850 to 900° C.) by means of the combustion radiation portion 112 on the occasion of feeding the steam-mixed natural gas via the raw gas-introducing passageway $120_1$ to the reaction tube 111. As a result, it is now possible to allow a reaction to effectively take place between mainly methane in the natural gas and the steam to thereby obtain a reformed gas comprising Co and $H_2$. On this occasion, the combustion exhaust gas discharged from the combustion radiation portion 112 is cooled, and then, the carbon dioxide contained in the combustion exhaust gas is recovered at the first carbon dioxide recovery device $131_1$ and transferred to the compressor 132. On the other hand, the carbon dioxide contained in the synthesis gas thus obtained is recovered at the second carbon dioxide recovery device $131_2$ and then, transferred via the passageway $120_{10}$ to the compressor 132 so as to be compressed together with the carbon dioxide recovered at the first carbon dioxide recovery device $131_1$, the resultant compressed carbon dioxide being transferred via the passageway $120_5$ to the raw gas-introducing passageway $120_1$ and added to the natural gas flowing through the raw gas-introducing passageway $120_1$. Thus, a reaction between the carbon dioxide and the steam is allowed to take place at the reaction tube 111, thereby producing CO and $H_2$, and at the same time, an oxygen source can be introduced into the reformed gas. As a result, it is possible to reduce the quantity of hydrogen in the reformed gas with the employment of a reduced quantity of oxygen supply on the occasion of burning hydrogen of the reformed gas using an externally supplied oxygen in the partial oxidation furnace 133 by introducing the reformed gas into the partial oxidation furnace 133, thus making it possible to manufacture a synthesis gas having a molar ratio of $H_2/CO=1$ to 2.5. Further, due to the provision of the partial oxidation furnace 133, the residual methane can be effectively reformed into CO and $H_2$. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Therefore, in the process of manufacturing a synthesis gas having a molar ratio of $H_2/CO$ which is suited for synthesizing gasoline, kerosene and gas oil by way of the Fisher-Tropsch reaction system (the manufacturing process comprising the steps of feeding a steam and carbon dioxide-mixed natural gas to the reformer, introducing a reformed gas from this reformer into the partial oxidation furnace, and feeding oxygen to the partial oxidation furnace to burn the hydrogen contained in the reformed gas), the quantity of oxygen to be supplied to the partial oxidation furnace can be reduced, thereby making it possible to miniaturize the oxygen plant for producing oxygen and hence to suppress an increase in manufacturing cost accompanied with the production of oxygen.

Additionally, since the carbon dioxide generated in the manufacturing plant (the reformer) of synthesis gas which comprises the Fisher-Tropsch (FT) reaction system is recovered, and at the same time, the carbon dioxide in the synthesis gas is recovered, all of the recovered carbon dioxide being subsequently added to the natural gas on the upstream side of the reformer, it is possible to utilize the carbon dioxide as a raw gas for the reformed gas and to minimize or prevent the discharge of carbon dioxide outside the manufacturing plant, which would become a cause for the warm-up of the earth.

Example 6

In this Example 6, the manufacture of a synthesis gas according to the aforementioned eighth Embodiment will be specifically explained with reference to FIG. 8.

A fuel (natural gas) was fed to the combustion radiation portion 112 of the reformer 110 at a flow rate of 519 kg·mol/hr and burnt together with air at the combustion radiation portion 112. Further, natural gas, steam and carbon dioxide (which was recovered from the combustion exhaust gas and synthesis gas both derived from the reformer 110) were fed under the conditions shown in the following Table 6 to the raw gas-introducing passageway $120_1$, and subjected to steam reforming at the reaction tube 111 of the reformer 110. Further, the reformed gas was introduced into the partial oxidation furnace 133, and at the same time, oxygen was introduced via the oxygen introducing passageway $120_7$ to the partial oxidation furnace 133 under the conditions shown in the following Table 6, thereby manufacturing a synthesis gas. The composition of the synthesis gas thus obtained is shown in the Table 6.

In Table 6, the item (A) represents natural gas to be fed to the raw gas-introducing passageway $120_1$; the item (B) represents steam to be fed to the raw gas-introducing passageway $120_1$; the item (C) represents carbon dioxide which was recovered by means of the first carbon dioxide recovery device $131_1$ from the combustion exhaust gas generated at the combustion radiation portion 112 of the reformer 110; the item (D) represents carbon dioxide which was recovered by means of the second carbon dioxide recovery device $131_2$ from the synthesis gas; the item (E) represents carbon dioxide which was recovered by means of the first and second carbon dioxide recovery devices $131_1$ and $131_2$, this recovered carbon dioxide being subsequently introduced into the raw gas-introducing passageway $120_1$ after it was compressed by the compressor 132; the item (F) represents oxygen to be fed to the partial oxidation furnace 133; the item (G) represents the synthesis gas which was manufactured at the partial oxidation furnace 133 so as to be transferred via the heat exchanger 134 to the second carbon dioxide recovery device $131_2$; the item (H) represents water to be discharged from the second carbon dioxide recovery device $131_2$; and the item (I) represents the synthesis gas obtained after the removal of carbon dioxide by means of the second carbon dioxide recovery device 131₂, the synthesis gas being subsequently fed to the FT reaction system 135. These items (A) to (I) are also shown in FIG. 8.

120₁₆ to the second carbon dioxide absorption tower 136₂. The absorption solution regenerator 137 is communicated via a passageway 120₁₈ with the compressor 132.

TABLE 6

| Item | (A) | (B) | (C) | (D) | (E) | (F) | (G) | (H) | (I) |
|---|---|---|---|---|---|---|---|---|---|
| Composition | | | | | | | | | |
| $CH_4$ (mol %) | 94 | — | — | — | — | — | 0.1 | — | 0.2 |
| $C_2H_6$ (mol %) | 6 | — | — | — | — | — | — | — | — |
| $H_2$ (mol %) | — | — | — | — | — | — | 43.3 | — | 66.2 |
| CO (mol %) | — | — | — | — | — | — | 21.6 | — | 33.1 |
| $CO_2$ (mol %) | — | — | 100 | 100 | 100 | — | 7.2 | — | — |
| $H_2O$ (mol %) | — | 100 | — | — | — | — | 27.8 | 100 | 0.5 |
| $O_2$ (mol %) | — | — | — | — | — | 99.5 | — | — | — |
| $N_2$ (mol %) | — | — | — | — | — | 0.5 | — | — | — |
| $H_2O$ (mol %) | 100 | 100 | 100 | 100 | 100 | 100 | 100 | 100 | 100 |
| Flow rate(kg · mol/hr) | 1000 | 2120 | 214 | 420 | 634 | 174 | 5860 | 1607 | 3833 |
| Temperature (° C.) | 400 | 200 | 40 | 40 | 150 | 40 | 40 | 40 | 40 |
| Pressure (kg/cm²G) | 20 | 20 | 0.1 | 0.1 | 20 | 20 | 15 | 0.1 | 15 |

As seen from Table 6, since the quantity of oxygen to be supplied to the partial oxidation furnace 133 was set to 174 kg·mol/hr in flow rate in the process wherein the carbon dioxide which was recovered by means of the first and second carbon dioxide recovery devices 131₁ and 131₂ was added to the steam-mixed natural gas, and then, the resultant gas mixture was allowed to be reformed at the reaction tube 111 of the reformer 110 that has been heated up to a predetermined temperature, the resultant reformed gas being subsequently introduced into the partial oxidation furnace 133, it was possible to manufacture a synthesis gas having a molar ratio of $H_2/CO$=about 2. This supplying quantity of oxygen corresponds to about a half of the supplying quantity of oxygen employed in the manufacturing method of synthesis gas which is shown in FIGS. 3 and 4 of the Japanese Patent Unexamined Publication H6-184559, thus indicating a prominent reduction in quantity of oxygen to be supplied to the partial oxidation furnace.

(Ninth Embodiment)

Figure 9:
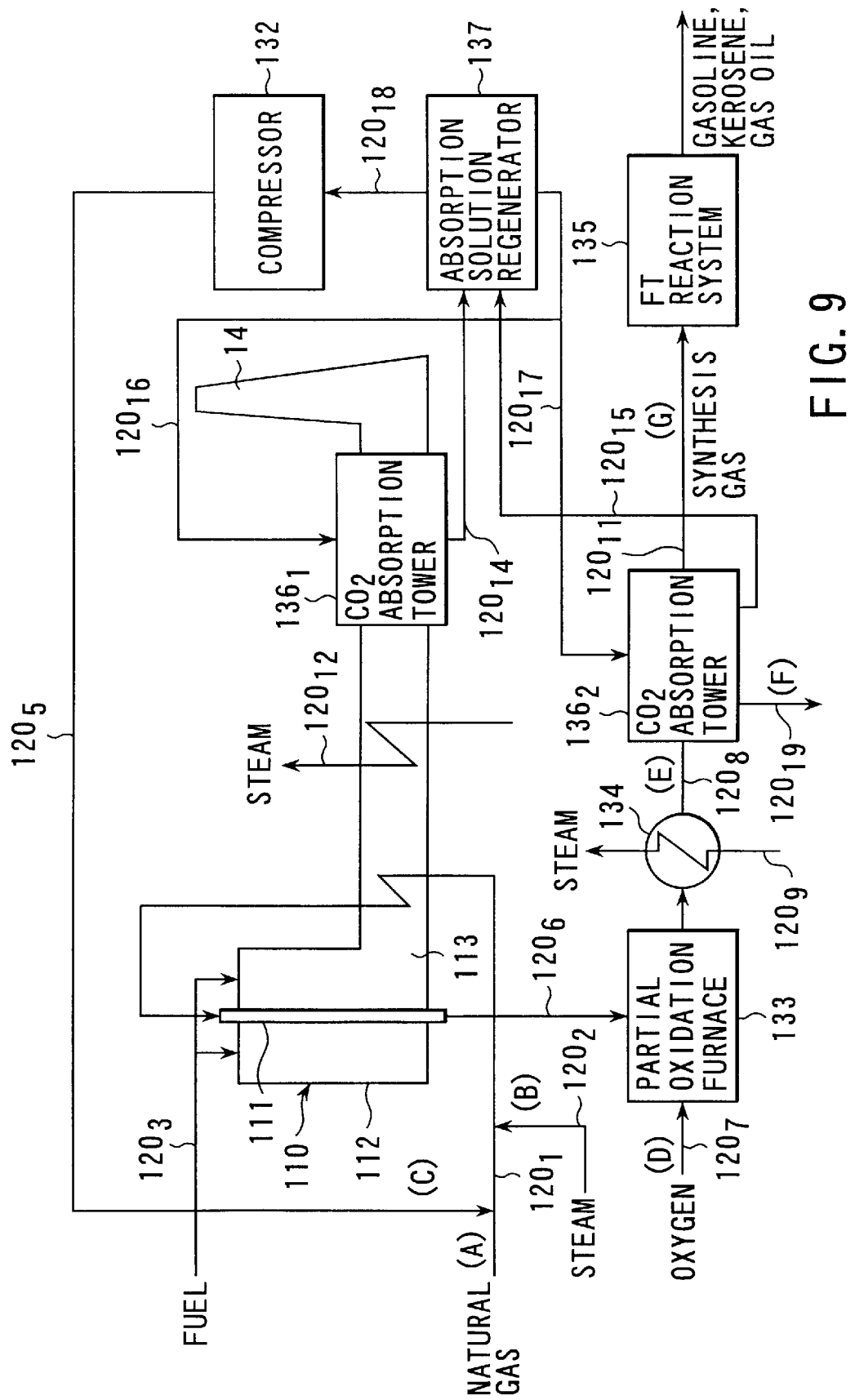
FIG. 9 is a flow chart illustrating main manufacturing steps of synthesis gas in a synthesizing plant of gasoline, kerosene and gas oil, which can be employed according to a ninth Embodiment of this invention.

FIG. 9 is a flow chart illustrating main manufacturing steps of synthesis gas in a synthesizing plant of gasoline, kerosene and gas oil, which can be employed according to the ninth Embodiment of this invention. In this FIG. 9, the same components as employed in the aforementioned FIG. 8 are identified by the same numbers, thereby omitting the explanation thereof.

This synthesizing plant is featured in that a first carbon dioxide absorption tower 136₁ is disposed at the convection portion 113 of the reformer 110, and an absorption solution for absorbing carbon dioxide in the combustion exhaust gas at the convection portion 113 is placed inside the first carbon dioxide absorption tower 136₁. Furthermore, a second carbon dioxide absorption tower 136₂ housing the same kind of absorption solution as that of the first carbon dioxide absorption tower 136₁ is communicated via the passageway 120₈ with the partial oxidation furnace 133. These first and second carbon dioxide absorption towers 136₁ and 136₂ are communicated respectively via passageways 120₁₄ and 120₁₅ with an absorption solution regenerator 137. The absorption solution employed for separating and recovering carbon dioxide at this absorption solution regenerator 137 is recirculated via a passageway 120₁₆ to the first carbon dioxide absorption tower 136₁ and also recirculated via a passageway 120₁₇ which is branched from the passageway 120₁₆ to the second carbon dioxide absorption tower 136₂. The absorption solution regenerator 137 is communicated via a passageway 120₁₈ with the compressor 132.

Next, the method of manufacturing a synthesis gas will be explained with reference to the aforementioned synthesizing plant shown in FIG. 9.

First of all, a fuel for combustion is fed via the fuel-introducing passageway 120₃ to the combustion radiation portion 112 of the reformer 110 so as to allow the fuel to burn together with air, thereby heating the reaction tube 111 up to a sufficiently high temperature (for example, 850 to 900° C.). The combustion exhaust gas containing carbon dioxide and generated at this combustion radiation portion 112 is allowed to flow via the convection portion 113 into the chimney 114. The combustion exhaust gas is heat-exchanged with the natural gas passing through the raw gas-introducing passageway 120₁ as well as with the boiler water passing through the passageway 120₁₂ as the combustion exhaust gas passes through the convection portion 113, thereby cooling the combustion exhaust gas. The carbon dioxide in the combustion exhaust gas that has been cooled in this manner is absorbed by the carbon dioxide absorption solution placed inside the first carbon dioxide absorption tower 136₁. The absorption solution having carbon dioxide absorbed therein is transferred via the passageway 120₁₄ to the absorption solution regenerator 137 to recover the carbon dioxide, which is then transferred via the passageway 120₁₈ to the compressor 132. The absorption solution from which the carbon dioxide has been removed is recirculated via the passageway 120₁₆ to the first carbon dioxide absorption tower 136₁. The cooled combustion exhaust gas from which the carbon dioxide has been removed is then released to air atmosphere through the chimney 114.

Natural gas containing methane as a main component is fed to the raw gas-introducing passageway 120₁. At this moment, the carbon dioxide that has been pressurized by the compressor 132 is added via the passageway 120₅ to the natural gas at a predetermined ratio. Further, steam is also added via the steam-introducing passageway 120₂ to the natural gas at a predetermined ratio. On the occasion of adding these steam and carbon dioxide to the natural gas, the molar ratios of these steam and carbon dioxide to the natural gas should preferably be set such that the ratio between methane ($CH_4$) and stream ($H_2O$) is 1:1.5 to 1:3; while the ratio between methane ($CH_4$) and carbon dioxide ($CO_2$) is 1:0.5 to 1:2. By the way, as for this steam, the steam that has been generated through a heat exchange between the boiler water and the synthesis gas at the heat exchanger 134 as well as the steam that has been generated through a heat exchange between the boiler water and the combustion exhaust gas at the convection portion 113 of reformer 110 can be utilized.

The natural gas mixed with carbon dioxide and steam is allowed to flow inside the raw gas-introducing passageway $120_1$ and heated (preliminarily heated) as the aforementioned mixed natural gas passes through the convection portion 113 of reformer 110. Thereafter, this mixed natural gas is fed to the reaction tube 111. The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO=1$ to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the second carbon dioxide recovery device $131_2$ housing therein the same kind of absorption solution as that housed inside the first carbon dioxide recovery device $131_1$. In this case, the carbon dioxide included in the synthesis gas is absorbed by the absorption solution, and at the same time, the water that has been concurrently produced is discharged outside the system through a passageway $120_{19}$. The absorption solution containing carbon dioxide is transferred via the passageway $120_{15}$ to the absorption solution regenerator 137, in which the carbon dioxide absorbed in the absorption solution is separated and recovered simultaneous with the separation and recovery of carbon dioxide from the absorption solution that has been transferred to the absorption solution regenerator 137 from the first carbon dioxide recovery device $131_1$. The carbon dioxide thus recovered is sent via the passageway $120_{18}$ to the compressor 132 so as to be compressed, the resultant compressed carbon dioxide being transferred via the passageway $120_5$ to the raw gas-introducing passageway $120_1$ and added to the natural gas existing in the raw gas-introducing passageway $120_1$. The absorption solution from which the carbon dioxide has been removed at the absorption solution regenerator 137 is recirculated via the passageway $120_{17}$ to the second carbon dioxide absorption tower $136_2$.

The synthesis gas from which carbon dioxide has been removed in this manner is then transferred via the passageway $120_{11}$ to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

According to this ninth Embodiment, it is possible to manufacture a synthesis gas comprising CO and $H_2$ at a molar ratio of $H_2/CO=1$ to 2.5 in the same manner as in the case of the eighth Embodiment. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the carbon dioxide included in the combustion exhaust gas which has been discharged from the combustion radiation portion 112 of the reformer 110 as well as the carbon dioxide included in the synthesis gas can be absorbed by making use of the same kind of absorption solution at the first and second carbon dioxide absorption towers $136_1$ and $136_2$, and the carbon dioxide thus absorbed in the absorption solution is subsequently recovered by the absorption solution regenerator 137, it is possible to simplify the synthesizing plant.

Example 7

In this Example 7, the manufacture of a synthesis gas according to the aforementioned ninth Embodiment will be specifically explained with reference to FIG. 9.

A fuel (natural gas) was fed to the combustion radiation portion 112 of the reformer 110 at a flow rate of 519 kg·mol/hr and burnt together with air at the combustion radiation portion 112. Further, natural gas, steam and carbon dioxide (which was recovered from the combustion exhaust gas and synthesis gas both derived from the reformer 110) were introduced into the raw gas-introducing passageway $120_1$ under the conditions shown in the following Table 7 to the raw gas-introducing passageway $120_1$, and subjected to steam reforming at the reaction tube 111 of the reformer 110. Further, the reformed gas was introduced into the partial oxidation furnace 133, and at the same time, oxygen was introduced via the oxygen introducing passageway $120_7$ to the partial oxidation furnace 133 under the conditions shown in the following Table 7, thereby manufacturing a synthesis gas. The composition of the synthesis gas thus obtained is shown in the Table 7.

In Table 7, the item (A) represents natural gas to be fed to the raw gas-introducing passageway $120_1$; the item (B) represents steam to be fed to the raw gas-introducing passageway $120_1$; the item (C) represents carbon dioxide which was absorbed by the same kind of absorption solution and recovered by means of the absorption solution regenerator $131_3$, the recovered carbon dioxide being subsequently compressed by the compressor 132 before it was transferred to the raw gas-introducing passageway $120_1$; the item (D) represents oxygen to be fed to the partial oxidation furnace 133; the item (E) represents the synthesis gas to be fed via the heat exchanger 134 to the second carbon dioxide absorption tower $136_2$; the item (F) represents water to be discharged from the second carbon dioxide absorption tower $136_2$; and the item (G) represents the synthesis gas where carbon dioxide has been removed at the second carbon dioxide absorption tower $136_2$ so as to be fed to the FT reaction system. These items (A) to (G) are also shown in FIG. 9.

TABLE 7

| Item | (A) | (B) | (C) | (D) | (E) | (F) | (G) |
|---|---|---|---|---|---|---|---|
| Composition | | | | | | | |
| $CH_4$ (mol %) | 94 | — | — | — | 0.1 | — | 0.2 |
| $C_2H_6$ (mol %) | 6 | — | — | — | — | — | — |
| $H_2$ (mol %) | — | — | — | — | 43.3 | — | 66.2 |
| CO (mol %) | — | — | — | — | 21.6 | — | 33.1 |
| $CO_2$ (mol %) | — | — | 100 | — | 7.2 | — | — |
| $H_2O$ (mol %) | — | 100 | — | — | 27.8 | 100 | 0.5 |
| $O_2$ (mol %) | — | — | — | 99.5 | — | — | — |
| $N_2$ (mol %) | — | — | — | 0.5 | — | — | — |
| $H_2O$ (mol %) | 100 | 100 | 100 | 100 | 100 | 100 | 100 |
| Flow rate (kg·mol/hr) | 1000 | 2120 | 634 | 174 | 5860 | 1607 | 3833 |
| Temperature (° C.) | 400 | 200 | 150 | 40 | 40 | 40 | 40 |
| Pressure (kg/cm$^2$G) | 20 | 20 | 20 | 20 | 15 | 0.1 | 15 |

As seen from Table 7, because of the process wherein the carbon dioxide which was absorbed by the same kind of absorption solution and recovered at the absorption solution regenerator 137 was added to the steam-mixed natural gas; the resultant natural gas mixture was reformed at the reaction tube 111 of the reformer 110 that has been heated up to a predetermined temperature; and the quantity of supplying oxygen to the partial oxidation furnace 133 was set to 174 kg·mol/hr in flow rate on the occasion of introducing the reformed gas into the partial oxidation furnace 133; it was possible to manufacture a synthesis gas having a molar ratio of $H_2/CO$=about 2.

(Tenth Embodiment)

Figure 10:
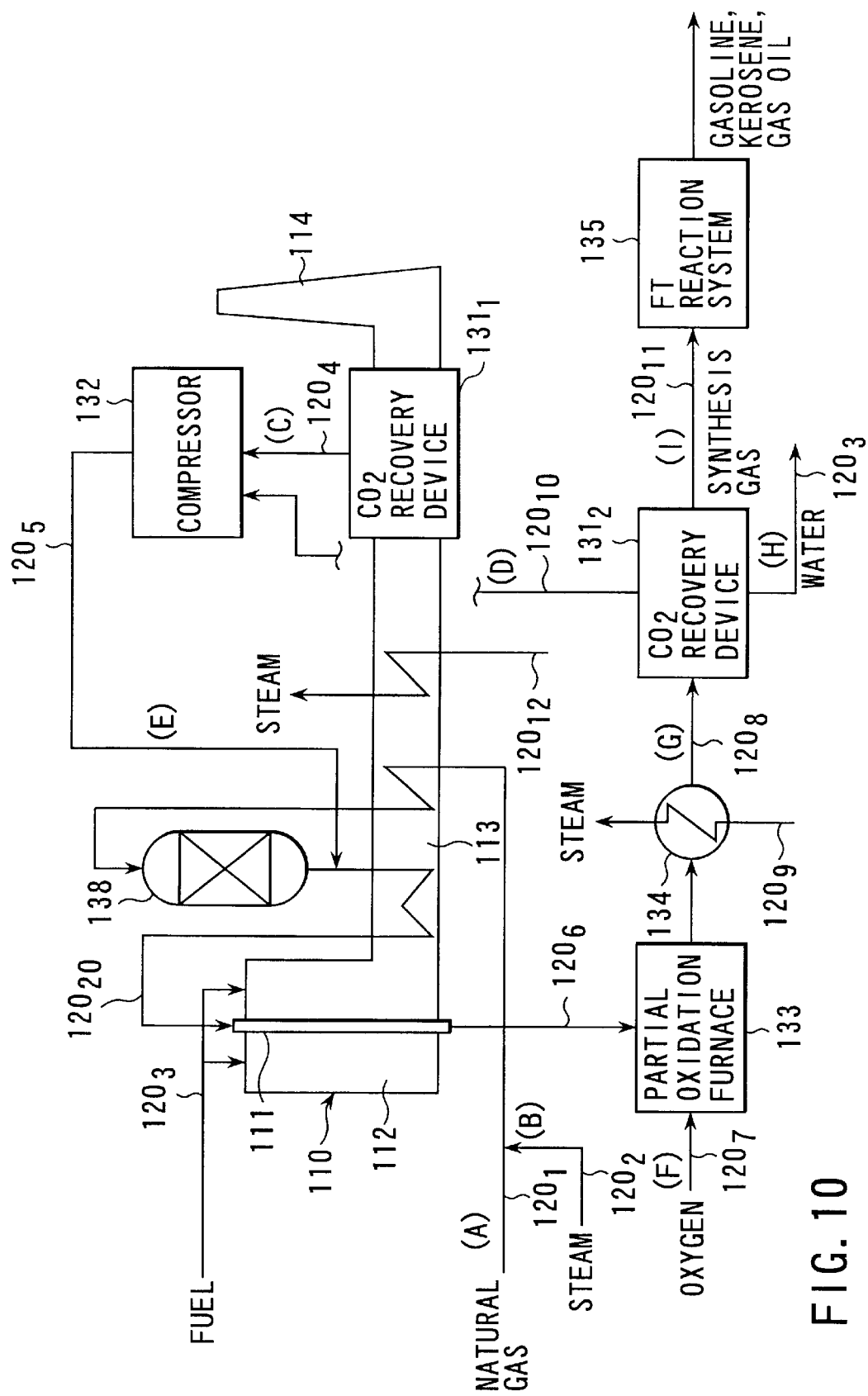
FIG. 10 is a flow chart illustrating main manufacturing steps of synthesis gas in a synthesizing plant of gasoline, kerosene and gas oil, which can be employed according to a tenth Embodiment of this invention.

FIG. 10 is a flow chart illustrating main manufacturing steps of synthesis gas in a synthesizing plant of gasoline, kerosene and gas oil, which can be employed according to the tenth Embodiment of this invention. In this FIG. 10, the same components as employed in the aforementioned FIG. 8 are identified by the same numbers, thereby omitting the explanation thereof.

This synthesizing plant is featured in that a preliminary reformer 138 is disposed on an upstream side of the reformer 110. The raw gas-introducing passageway $120_1$ is communicated with a top portion of the preliminary reformer 138. This preliminary reformer 138 is communicated via the passageway $120_{20}$ with an upper end of the reaction tube 111 of the reformer 110. The passageway $120_{20}$ is communicated via the convection portion 113 of the reformer 110 with the reaction tube 111. The compressor 132 is communicated via the passageway $120_5$ to the passageway $120_{20}$ which is disposed to connect the preliminary reformer 138 with the reformer 110. Next, the method of manufacturing a synthesis gas will be explained with reference to the aforementioned synthesizing plant shown in FIG. 10.

First of all, in the same manner as in the eighth Embodiment, a fuel for combustion is fed to the combustion radiation portion 112 of the reformer 110 so as to heat the reaction tube 111 up to a predetermined temperature (for example, 850 to 900° C). The carbon dioxide included in the combustion exhaust gas which has been generated at the combustion radiation portion 112 and cooled subsequently is recovered at the first carbon dioxide recovery device $131_1$ and then, transferred to the compressor 132.

Natural gas containing methane as a main component is fed to the raw gas-introducing passageway $120_1$. At this moment, steam is also added via the steam-introducing passageway $120_2$ to the natural gas at a predetermined ratio.

On the occasion of adding these steam and carbon dioxide to the natural gas, the molar ratios of these steam and carbon dioxide to the natural gas should preferably be set such that the ratio between methane ($CH_4$) and stream ($H_2O$) is 1:1.5 to 1:3.

The natural gas mixed with steam is allowed to flow inside the raw gas-introducing passageway $120_1$ and heated (preliminarily heated) as the aforementioned mixed natural gas passes through the convection portion 113 of reformer 110. Thereafter, this mixed natural gas is fed to the preliminary reformer 138. In this preliminary reformer 138, the hydrocarbons of the natural gas which have two or more carbon atoms, mainly ethane, are reformed into methane having one carbon atom, CO and $H_2$.

The steam-mixed natural gas preliminarily reformed in this manner is then fed via the passageway $120_{20}$ to the reaction tube 111 of the reformer 110. On this occasion, the carbon dioxide that has been compressed by the compressor 132 is added at a predetermined ratio via the passageway $120_5$ to the steam-mixed natural gas reformed preliminarily as mentioned above and flowing through the passageway $120_{20}$. On the occasion of adding carbon dioxide to the preliminarily reformed natural gas, the molar ratios of these steam and carbon dioxide to the natural gas should preferably be set such that the ratio between methane ($CH_4$) and carbon dioxide ($CO_2$) is 1:0.5 to 1:2.

The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO$=1 to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the second carbon dioxide recovery device $131_2$. In this case, the carbon dioxide included in the synthesis gas is recovered, and at the same time, the water that has been concurrently produced is discharged outside the system through a passageway $120_{13}$. The carbon dioxide thus recovered is transferred via the passageway $120_{10}$ to the compressor 132 so as to be compressed together with the carbon dioxide that has been recovered at the first carbon dioxide recovery device $131_1$, the resultant compressed carbon dioxide being added via the passageway $120_5$ to the natural gas existing inside the passageway $120_{20}$.

The synthesis gas from which carbon dioxide has been removed in this manner is then transferred via the passageway $120_{11}$ to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

According to this tenth Embodiment, it is possible to manufacture a synthesis gas comprising CO and $H_2$ at a molar ratio of $H_2/CO$=1 to 2.5 in the same manner as in the case of the eighth Embodiment. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the preliminary reformer 138 is disposed on an upstream side of the reformer 110 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 110. As a result, the quantity of fuel to be fed to the combustion radiation portion 112 of the reformer 110 can be reduced, thus making it possible to manufacture a synthesis gas with a decreased quantity of fuel.

Example 8

In this Example 8, the manufacture of a synthesis gas according to the aforementioned tenth Embodiment will be specifically explained with reference to FIG. 10.

A fuel (natural gas) was fed to the combustion radiation portion 112 of the reformer 110 at a flow rate of 443 kg·mol/hr and burnt together with air at the combustion radiation portion 112. Further, natural gas and steam were introduced into the raw gas-introducing passageway $120_1$ under the conditions shown in the following Table 8, and also carbon dioxide (which was recovered from the combustion exhaust gas and synthesis gas both derived from the reformer 110) was added under the conditions shown in the following Table 8 to the preliminarily reformed steam-mixed natural gas flowing inside the passageway $120_{20}$ disposed connecting the preliminary reformer 138 with the reformer 110, thereby subjecting the natural gas to steam reforming at the reaction tube 111 of the reformer 110. Further, the resultant reformed gas was introduced into the partial oxidation furnace 133, and at the same time, oxygen was introduced via the oxygen introducing passageway $120_7$ to the partial oxidation furnace 133 under the conditions shown in the following Table 8, thereby manufacturing a synthesis gas. The composition of the synthesis gas thus obtained is shown in the Table 8.

In Table 8, the item (A) represents natural gas to be fed to the raw gas-introducing passageway $120_1$; the item (B) represents steam to be fed to the raw gas-introducing passageway $120_1$; the item (C) represents carbon dioxide which was recovered by means of the first absorption solution regenerator $131_1$ from the combustion exhaust gas generated at the combustion radiation portion 112 of the reformer 110; the item (D) represents carbon dioxide which was recovered by means of the second absorption solution regenerator $131_2$ from the synthesis gas; the item (E) represents carbon dioxide which was recovered by means of the first and second carbon dioxide recovery devices $131_1$ and $131_2$, this recovered carbon dioxide being subsequently introduced into the passageway $120_{20}$ disposed to connect the preliminary reformer 138 with the reformer 110 after the natural gas was compressed by the compressor 132; the item (F) represents oxygen to be fed to the partial oxidation furnace 133; the item (G) represents the synthesis gas which was manufactured at the reformer 110 and then, fed via the heat exchanger 134 to the second carbon dioxide recovery device $131_2$; the item (H) represents water to be discharged from the second carbon dioxide recovery device $131_2$; and the item (I) represents a synthesis gas obtained after the removal of carbon dioxide therefrom at the second carbon dioxide recovery device $131_2$, the synthesis gas being subsequently fed to the FT reaction system 135. These items (A) to (I) are also shown in FIG. 10.

TABLE 8

| Item | (A) | (B) | (C) | (D) | (E) | (F) | (G) | (H) | (I) |
| --- | --- | --- | --- | --- | --- | --- | --- | --- | --- |
| Composition | | | | | | | | | |
| $CH_4$ (mol %) | 94 | — | — | — | — | — | 0.1 | — | 0.2 |
| $C_2H_6$ (mol %) | 6 | — | — | — | — | — | — | — | — |
| $H_2$ (mol %) | — | — | — | — | — | — | 43.4 | — | 66.2 |
| CO (mol %) | — | — | — | — | — | — | 21.6 | — | 33.1 |
| $CO_2$ (mol %) | — | — | 100 | 100 | 100 | — | 7.2 | — | — |
| $H_2O$ (mol %) | — | 100 | — | — | — | — | 27.8 | 100 | 0.5 |
| $O_2$ (mol %) | — | — | — | — | — | 99.5 | — | — | — |
| $N_2$ (mol %) | — | — | — | — | — | 0.5 | — | — | — |
| $H_2O$ (mol %) | 100 | 100 | 100 | 100 | 100 | 100 | 100 | 100 | 100 |
| Flow rate(kg · mol/hr) | 1000 | 2120 | 214 | 420 | 634 | 174 | 5860 | 1607 | 3833 |
| Temperature (° C.) | 400 | 200 | 40 | 40 | 150 | 40 | 40 | 40 | 40 |
| Pressure (kg/cm²G) | 20 | 20 | 0.1 | 0.1 | 20 | 20 | 15 | 0.1 | 15 |

As seen from Table 8, because of the process wherein the carbon dioxide which was recovered at the first and second carbon dioxide recovery devices $131_1$ and $131_2$ was added to the steam-mixed natural gas; the resultant natural gas mixture was reformed at the reaction tube 111 of the reformer 110 that has been heated up to a predetermined temperature; and the quantity of supplying oxygen to the partial oxidation furnace 133 was set to 174 kg·mol/hr in flow rate on the occasion of introducing the reformed gas into the partial oxidation furnace 133; it was possible to manufacture a synthesis gas having a molar ratio of $H_2/CO$=about 2 even if the quantity of oxygen supplied to the combustion radiation portion 112 of the reformer 110 was reduced by about 20% as compared with that employed in the aforementioned eighth Embodiment.

(Eleventh Embodiment)

Figure 11:
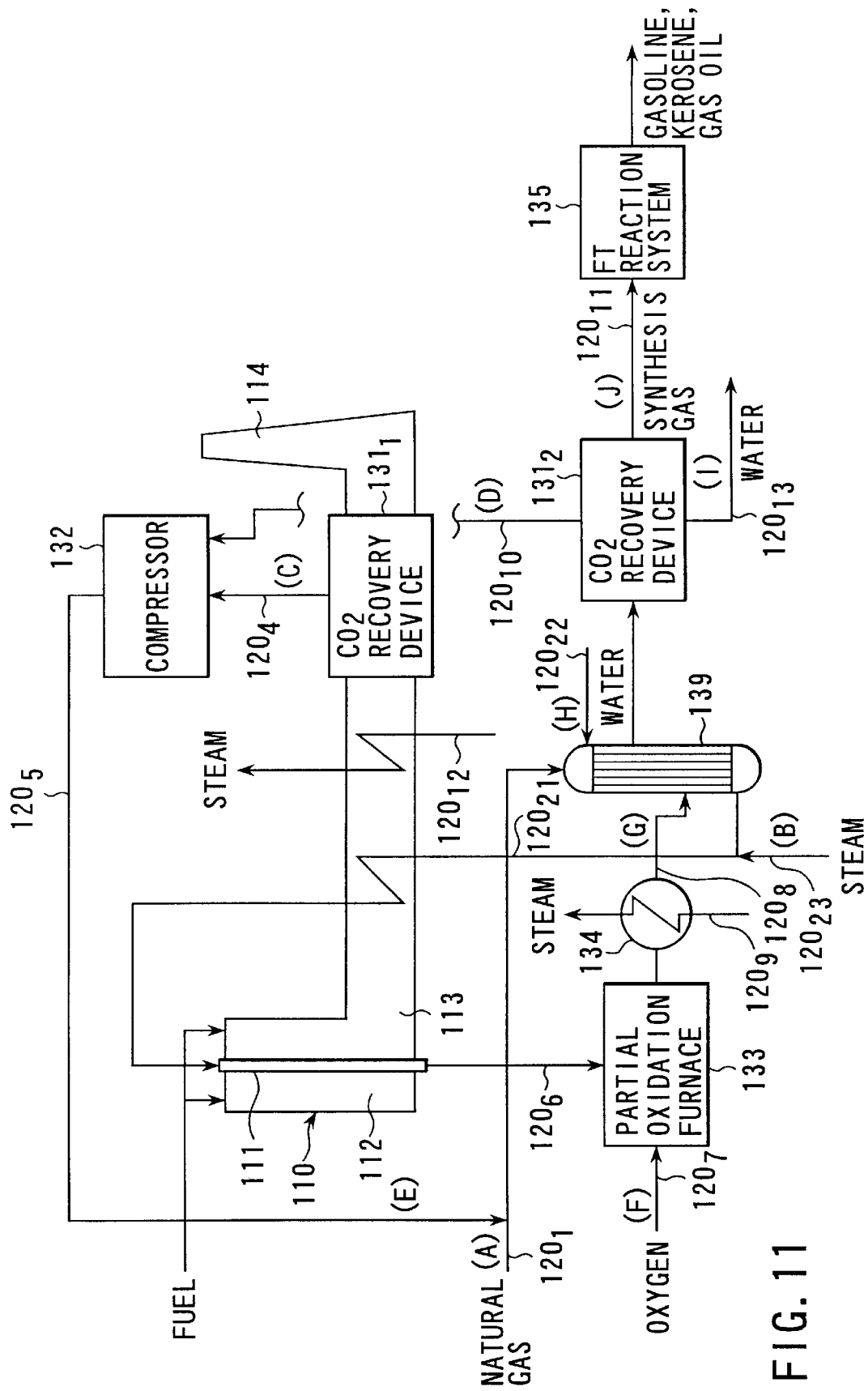
FIG. 11 is a flow chart illustrating main manufacturing steps of synthesis gas in a synthesizing plant of gasoline, kerosene and gas oil, which can be employed according to a eleventh Embodiment of this invention.

FIG. 11 is a flow chart illustrating main manufacturing steps of synthesis gas in a synthesizing plant of gasoline, kerosene and gas oil, which can be employed according to the eleventh Embodiment of this invention. In this FIG. 11, the same components as employed in the aforementioned FIG. 8 are identified by the same numbers, thereby omitting the explanation thereof.

This synthesizing plant is featured in that a heat exchange type moistening device 139 is disposed at a midway of the passageway $120_8$ which is located between the heat exchanger 134 and the second carbon dioxide recovery device $131_2$, both being disposed on a downstream side of the reformer 110. The raw gas-introducing passageway $120_1$ is communicated with a top portion of the moistening device 139. This moistening device 139 is communicated via the passageway $120_{21}$ with an upper end of the reaction tube 111 of the reformer 110. The passageway $202_1$ is communicated via the convection portion 113 of the reformer 110 with the reaction tube 111.

Next, the method of manufacturing a synthesis gas will be explained with reference to the aforementioned synthesizing plant shown in FIG. 11.

First of all, in the same manner as in the eighth Embodiment, a fuel for combustion is fed to the combustion radiation portion 112 of the reformer 110 so as to heat the reaction tube 111 up to a predetermined temperature (for example, 850 to 900° C.). The carbon dioxide included in the combustion exhaust gas which has been generated at the combustion radiation portion 112 and cooled subsequently is recovered at the first carbon dioxide recovery device $131_1$ and then, transferred to the compressor 132.

Natural gas containing methane as a main component is fed to the raw gas-introducing passageway $120_1$. At this moment, the carbon dioxide compressed by the compressor 132 is added via the passageway $120_5$ to the natural gas at a predetermined ratio. On the occasion of adding carbon dioxide to the natural gas, the molar ratio of the carbon dioxide to the natural gas should preferably be set such that the ratio between methane ($CH_4$) and carbon dioxide ($CO_2$) is 1:0.5 to 1:2. The natural gas mixed with carbon dioxide (carbon dioxide-mixed natural gas) is allowed to flow inside the raw gas-introducing passageway $120_1$ and fed to a top portion of the moistening device 139. Water is introduced via the passageway $120_{22}$ into this top portion of the moistening device 139 to moisten the aforementioned carbon dioxide-mixed natural gas. Specifically, this carbon dioxide-mixed natural gas is allowed to contact with water that has been supplied from the passageway $120_{22}$ in the moistening device 139, thus moistening the carbon dioxide-mixed natural gas with the water, after which the carbon dioxide-mixed natural gas is heated and additionally moistened through the heat-exchange thereof with a high-temperature synthesis gas that has been supplied via the passageway $120_8$ from the partial oxidation furnace 133.

This moistened carbon dioxide-mixed natural gas is then fed via the passageway $120_{21}$ to the reaction tube 111 of the reformer 110. On this occasion, steam is supplied to a mixed gas flowing through the passageway $120_{21}$ from the passageway $120_{23}$, thereby making up the shortage in quantity of steam. On the occasion of adding steam through the moistening and also through the passageway $120_{23}$ to the carbon dioxide-mixed natural gas, the molar ratio of the steam to the natural gas should preferably be set such that the ratio between methane ($CH_4$) and stream ($H_2O$) is 1:1.5 to 1:3. The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO=1$ to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the moistening device 139 so as to be utilized as a heating source for humidifying the carbon dioxide-mixed natural gas. The synthesis gas discharged from the moistening device 139 is sent to the second carbon dioxide recovery device $131_2$ in which the carbon dioxide included in the synthesis gas is recovered, and at the same time, the water that has been concurrently produced is discharged outside the system through a passageway $120_{13}$. The carbon dioxide thus recovered is transferred via the passageway $120_{10}$ to the compressor 132 so as to be compressed together with the carbon dioxide that has been recovered at the first carbon dioxide recovery device $131_1$, the resultant compressed carbon dioxide being added via the passageway $120_5$ to the natural gas existing inside the raw gas-introducing passageway $120_1$.

The synthesis gas from which carbon dioxide has been removed in this manner is then transferred via the passageway $120_{11}$ to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

According to this eleventh Embodiment, it is possible to manufacture a synthesis gas comprising Co and $H_2$ at a molar ratio of $H_2/CO=1$ to 2.5 in the same manner as in the case of the eighth Embodiment. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the moistening device 139 is disposed on a downstream side of the reformer 110 so as to moisten the natural gas, it is possible to reduce the quantity of steam to be supplied via the passageway $120_{23}$ to the carbon dioxide-mixed natural gas. As a result, the quantity of steam to be fed together with the natural gas to the reaction tube 111 of the reformer 110 can be reduced, thus making it possible to manufacture a synthesis gas at a low cost.

Example 9

In this Example 9, the manufacture of a synthesis gas according to the aforementioned eleventh Embodiment will be specifically explained with reference to FIG. 11.

A fuel (natural gas) was fed to the combustion radiation portion 112 of the reformer 110 at a flow rate of 519 kg·mol/hr and burnt together with air at the combustion radiation portion 112. Further, natural gas and carbon dioxide (which was recovered from the combustion exhaust gas and synthesis gas both derived from the reformer 110) were introduced via the raw gas-introducing passageway $120_1$ into the moistening device 139 under the conditions shown in the following Table 9, and also steam was added under the conditions shown in the following Table 9 to the preliminarily moistened carbon dioxide-mixed natural gas flowing inside the passageway $120_{21}$, thereby subjecting all of the natural gas, steam and carbon dioxide to steam reforming at the reaction tube 111 of the reformer 110. Further, the resultant reformed gas was introduced into the partial oxidation furnace 133, and at the same time, oxygen was introduced via the oxygen introducing passageway $120_7$ to the partial oxidation furnace 133 under the conditions shown in the following Table 9, thereby manufacturing a synthesis gas. The composition of the synthesis gas thus obtained is shown in the Table 9.

In Table 9, the item (A) represents natural gas to be fed to the raw gas-introducing passageway $120_1$; the item (B) represents steam to be fed to the raw gas-introducing passageway $120_1$ through which the preliminarily moistened carbon dioxide-mixed natural gas was allowed to flow; the item (C) represents carbon dioxide which was recovered by means of the first absorption solution regenerator $131_1$ from the combustion exhaust gas generated at the combustion radiation portion 112 of the reformer 110; the item (D) represents carbon dioxide which was recovered by means of the second absorption solution regenerator $131_2$ from the synthesis gas; the item (E) represents carbon dioxide which was recovered by means of the first and second carbon dioxide recovery devices $131_1$ and $131_2$, this recovered carbon dioxide being subsequently introduced into the passageway $120_1$ after the natural gas was compressed by the compressor 132; the item (F) represents oxygen to be fed to the partial oxidation furnace 133; the item (G) represents the synthesis gas which was manufactured at the reformer 110 and then, fed via the heat exchanger 134 and the moistening device 139 to the second carbon dioxide recovery device $131_2$; the item (H) represents water to be fed to the moistening device 139; the item (I) represents water to be discharged from the second carbon dioxide recovery device $131_2$; and the item (J) represents a synthesis gas obtained after the removal of carbon dioxide therefrom at the second carbon dioxide recovery device $131_2$, the synthesis gas being subsequently fed to the FT reaction system 135. These items (A) to (J) are also shown in FIG. 11.

TABLE 9

| Item | (A) | (B) | (C) | (D) | (E) | (F) | (G) | (H) | (I) | (J) |
|---|---|---|---|---|---|---|---|---|---|---|
| Composition | | | | | | | | | | |
| CH$_4$ (mol %) | 94 | — | — | — | — | — | 0.1 | — | — | 0.2 |
| C$_2$H$_6$ (mol %) | 6 | — | — | — | — | — | — | — | — | — |
| H$_2$ (mol %) | — | — | — | — | — | — | 43.4 | — | — | 66.2 |
| CO (mol %) | — | — | — | — | — | — | 21.6 | — | — | 33.1 |
| CO$_2$ (mol %) | — | — | 100 | 100 | 100 | — | 7.2 | — | — | — |
| H$_2$O (mol %) | — | 100 | — | — | — | — | 27.8 | 100 | 100 | 0.5 |
| O$_2$ (mol %) | — | — | — | — | — | 99.5 | — | — | — | — |
| N$_2$ (mol %) | — | — | — | — | — | 0.5 | — | — | — | — |
| H$_2$O (mol %) | 100 | 100 | 100 | 100 | 100 | 100 | 100 | 100 | 100 | 100 |
| Flow rate(kg · mol/hr) | 1000 | 243 | 214 | 420 | 634 | 174 | 5860 | 1877 | 1607 | 3833 |
| Temperature (° C.) | 400 | 200 | 40 | 40 | 150 | 40 | 40 | 40 | 40 | 40 |
| Pressure (kg/cm$^2$G) | 20 | 20 | 0.1 | 0.1 | 20 | 20 | 15 | 20 | 0.1 | 15 |

As seen from Table 9, because of the process wherein the carbon dioxide which was recovered at the first and second carbon dioxide recovery devices $131_1$ and $131_2$ was added to the steam-mixed natural gas; the resultant natural gas mixture was passed through the moistening device 139 and then, reformed at the reaction tube 111 of the reformer 110 that has been heated up to a predetermined temperature; and the quantity of supplying oxygen to the partial oxidation furnace 133 was set to 174 kg·mol/hr in flow rate on the occasion of introducing the reformed gas into the partial oxidation furnace 133; it was possible to manufacture almost the same quantity of synthesis gas having a molar ratio of H$_2$/CO= about 2 even if the quantity of steam to be supplied was reduced to about ⅓ as compared with that employed in the aforementioned eighth Embodiment.

(Twelfth Embodiment)

Figure 12:
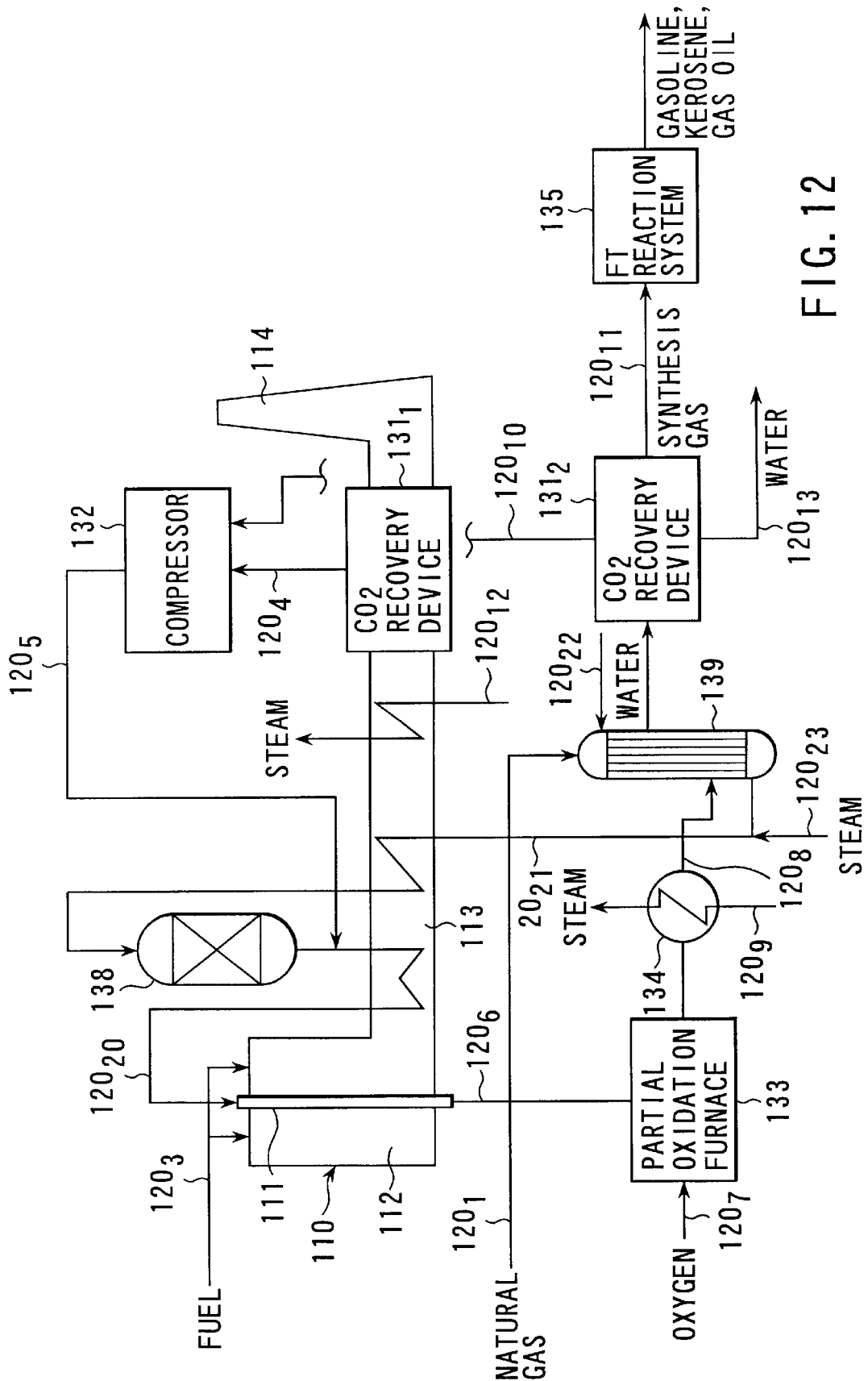
FIG. 12 is a flow chart illustrating main manufacturing steps of synthesis gas in a synthesizing plant of gasoline, kerosene and gas oil, which can be employed according to a twelfth Embodiment of this invention.

FIG. 12 is a flow chart illustrating main manufacturing steps of synthesis gas in a synthesizing plant of gasoline, kerosene and gas oil, which can be employed according to the twelfth Embodiment of this invention. In this FIG. 12, the same components as employed in the aforementioned FIG. 8 are identified by the same numbers, thereby omitting the explanation thereof.

This synthesizing plant is featured in that a heat exchange type moistening device 139 is disposed at a midway of the passageway $120_8$ which is located between the heat exchanger 134 and the second carbon dioxide recovery device $131_2$, both being disposed on a downstream side of the reformer 110. The raw gas-introducing passageway $120_1$ is communicated with a top portion of the moistening device 139. This moistening device 139 is communicated via the passageway $120_{21}$ with a top portion of the preliminary reformer 138 located on an upstream side of the reformer 110. This preliminary reformer 138 is communicated via the passageway $120_{20}$ with an upper end of the reaction tube 111 of the reformer 110. The passageway $120_{20}$ is communicated via the convection portion 113 of the reformer 110 with the reaction tube 111. The compressor 132 is communicated via the passageway 120$_5$ with the passageway 120$_{20}$ which is disposed connecting the preliminary reformer 138 with the reformer 110.

Next, the method of manufacturing a synthesis gas will be explained with reference to the aforementioned synthesizing plant shown in FIG. 12.

First of all, in the same manner as in the eighth Embodiment, a fuel for combustion is fed to the combustion radiation portion 112 of the reformer 110 so as to heat the reaction tube 111 up to a sufficiently high temperature (for example, 850 to 900° C.). The carbon dioxide included in the combustion exhaust gas which has been generated at the combustion radiation portion 112 and cooled subsequently is recovered at the first carbon dioxide recovery device 131$_1$ and then, transferred to the compressor 132.

Natural gas containing methane as a main component is fed via the raw gas-introducing passageway 120$_1$ to an top portion of the moistening device 139. Water is introduced via the passageway 120$_{22}$ into this top portion of the moistening device 139 to moisten the aforementioned carbon dioxide-mixed natural gas. Specifically, the natural gas is allowed to contact with water that has been supplied from the passageway 120$_{22}$ in the moistening device 139, thus moistening the natural gas with the water, after which the moistened natural gas is heated and additionally moistened through the heat-exchange thereof with a high-temperature synthesis gas that has been supplied via the passageway 120$_8$ from the partial oxidation furnace 133.

This moistened natural gas is then fed via the passageway 120$_{21}$ to the preliminary reformer 138. On this occasion, steam is supplied to the natural gas flowing through the passageway 120$_{21}$ from the passageway 120$_{23}$, thereby making up the shortage in quantity of steam. On the occasion of adding steam through the moistening and also through the passageway 120$_{23}$ to the carbon dioxide-mixed natural gas, the molar ratio of the steam to the natural gas should preferably be set such that the ratio between methane ($CH_4$) and stream ($H_2O$) is 1:1.5 to 1:3.

Further, this moistened steam-mixed natural gas is allowed to pass through the passageway 120$_{21}$ and heated (preliminarily heated) as the natural gas passes through the convection portion 113 of the reformer 110. In the aforementioned preliminary reformer 138, the hydrocarbons of the natural gas which have two or more carbon atoms, mainly ethane, are reformed into methane having one carbon atom, CO and $H_2$.

The steam-mixed natural gas preliminarily reformed in this manner is then fed via the passageway 120$_{20}$ to the reaction tube 111 of the reformer 110. On this occasion, the carbon dioxide that has been compressed by the compressor 132 is fed at a predetermined ratio via the passageway 120$_5$ to the steam-mixed natural gas reformed preliminarily as mentioned above and flowing through the passageway 120$_{20}$. On the occasion of adding carbon dioxide to the natural gas, the molar ratio of the carbon dioxide to the natural gas should preferably be set such that the ratio between methane ($CH_4$) and carbon dioxide ($CO_2$) is 1:0.5 to 1:2.

The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway 120$_6$ to the partial oxidation furnace 133, in which the hydrogen in the reformed gas is allowed to burn by the oxygen that has been introduced therein from the oxygen introducing passageway 120$_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO$=1 to 2.5 through the operation of the partial oxidation furnace 133.

The synthesis gas produced at the partial oxidation furnace 133 is fed via the passageway 120$_8$ to heat exchanger 134 to heat the boiler water flowing through the passageway 120$_9$, thereby generating a high-pressure steam. Concurrently, the synthesis gas itself is cooled and then, fed to the moistening device 139 so as to be utilized as a heating source for moistening the carbon dioxide-mixed natural gas. The synthesis gas discharged from the moistening device 139 is sent to the second carbon dioxide recovery device 131$_2$ in which the carbon dioxide included in the synthesis gas is recovered, and at the same time, the water that has been concurrently produced is discharged outside the system through a passageway 120$_{13}$. The carbon dioxide thus recovered is transferred via the passageway 120$_{10}$ to the compressor 132 so as to be compressed together with the carbon dioxide that has been recovered at the first carbon dioxide recovery device 131$_1$, the resultant compressed carbon dioxide being added via the passageway 120$_5$ to the natural gas existing inside the passageway 120$_{20}$.

The synthesis gas from which carbon dioxide has been removed in this manner is then transferred via the passageway 120$_{11}$ to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

According to this twelfth Embodiment, it is possible to manufacture a synthesis gas comprising Co and $H_2$ at a molar ratio of $H_2/CO$=1 to 2.5 in the same manner as in the case of the eighth Embodiment. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Additionally, since the preliminary reformer 138 is provided to an upstream side of the reformer 110 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 110. As a result, the quantity of fuel to be fed to the combustion radiation portion 112 of the reformer 110 can be reduced, thus making it possible to manufacture a synthesis gas at low cost.

Moreover, since the heat exchanger type moistening device 139 is provided to an downstream side of the reformer 110 to moisten the natural gas, it possible to reduce the quantity of steam to be supplied via the passageway $120_{23}$ to the natural gas. As a result, the quantity of steam to be fed together with the natural gas to the reaction tube 111 of the reformer 110 can be reduced, thus making it possible to manufacture a synthesis gas at low cost.

By the way, in all of the foregoing embodiments according to tenth to twelfth Embodiments, the first and second carbon dioxide absorption towers both housing the same kind of carbon dioxide absorption solution and a single absorption solution regenerator, which are employed in the aforementioned ninth Embodiment, may be substituted for the first and second carbon dioxide recovery devices employed in these tenth to twelfth Embodiments for the manufacture of the synthesis gas.

(Thirteenth Embodiment)

Figure 13:
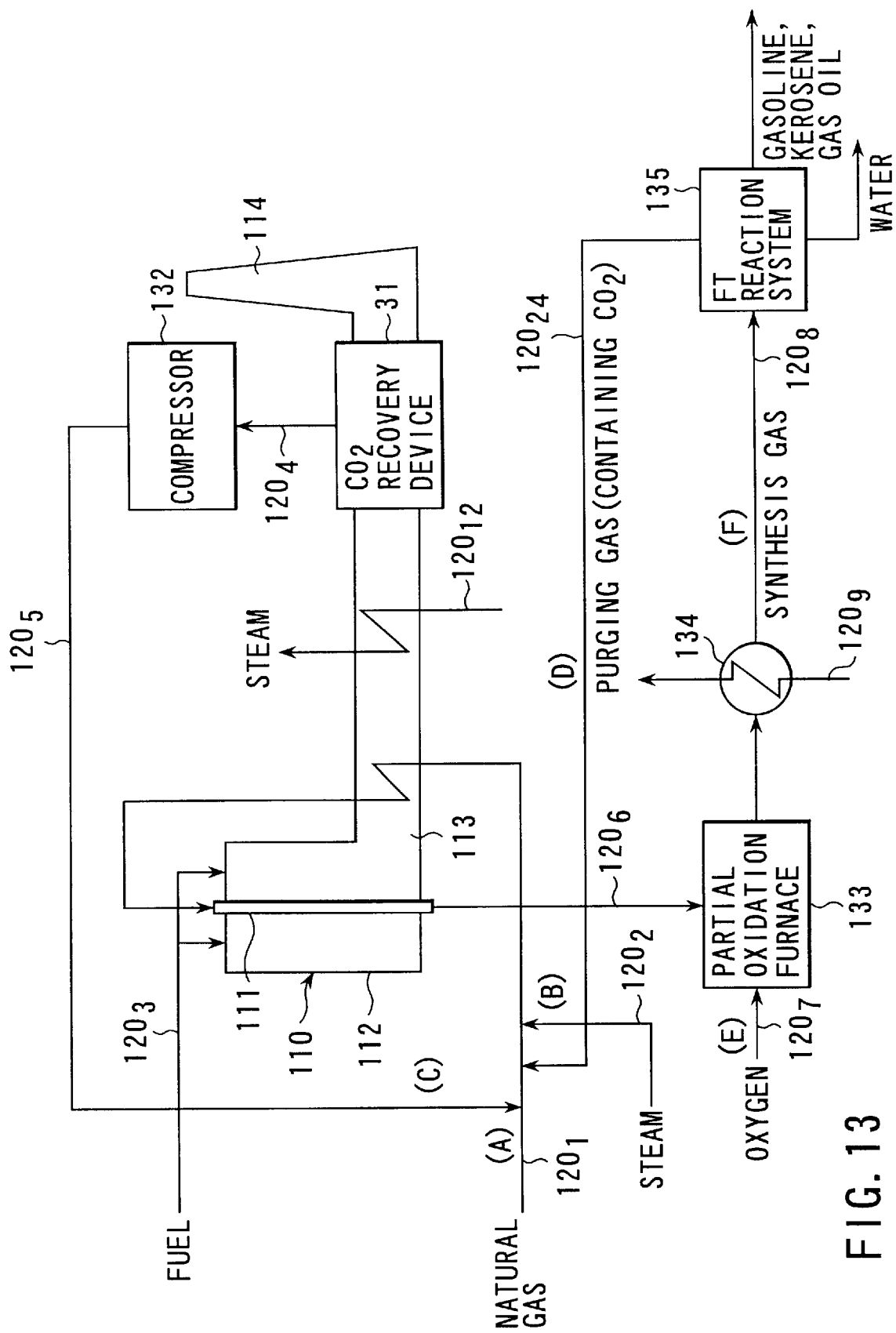
FIG. 13 is a flow chart illustrating main manufacturing steps of synthesis gas in a synthesizing plant of gasoline, kerosene and gas oil, which can be employed according to a thirteenth Embodiment of this invention.

FIG. 13 is a flow chart illustrating main manufacturing steps of synthesis gas in a synthesizing plant of gasoline, kerosene and gas oil, which can be employed according to the thirteenth Embodiment of this invention.

Referring to FIG. 13, a reformer 110 comprises a reaction tube 111 adapted to be employed for steam reforming, a combustion radiation portion 112 disposed around the reaction tube 111, and a chimney 114 which is communicated via a convection portion (waste heat recovering portion) 113 with the combustion radiation portion 112. The reaction tube 111 is filled therein with a nickel-based catalyst for instance.

A fuel-introducing passageway $120_3$ is communicated with the combustion radiation portion 112 of the reformer 110.

A raw gas-introducing passageway $120_1$ is communicated via a convection portion 113 of the reformer 110 with an upper end of the reaction tube 111. This raw gas-introducing passageway $120_1$ may be provided with a desulfurizer (not shown). The steam-introducing passageway $120_2$ is communicated with the raw gas-introducing passageway $120_1$ which is positioned on an upstream side of the convection portion 113.

A carbon dioxide recovery device 131 is disposed at the convection portion 113 of the reformer 110 so as to enable it to recover carbon dioxide from the combustion exhaust gas existing in the convection portion 113. This carbon dioxide recovery device 131 is communicated via a passageway $120_4$ with a compressor 132. This compressor 132 is communicated via a passageway $120_5$ with the raw gas-introducing passageway $120_1$ which is positioned on an upstream side of the reformer 110.

A lower end of the reaction tube 111 of the reformer 110 is communicated via the passageway $120_6$ with the partial oxidation furnace 133. The oxygen-introducing passageway $120_7$ is also communicated with the partial oxidation furnace 133. This partial oxidation furnace 133 is communicated via the passageway $120_8$ with the Fisher-Tropsch (FT) reaction system 135 which is filled with a cobalt-based catalyst for instance. This FT reaction system 135 is communicated, via a purging gas flow passageway $120_{24}$ for feeding a purging gas, with the raw gas-introducing passageway $120_1$ which is located on an upstream side of the reformer 110. By the way, the catalyst to be filled in this FT reaction system 135 may not be confined to the cobalt-based catalyst but may be an iron-based catalyst for instance. A heat exchanger 134 is disposed at a midway of the passageway $120_8$. The heat exchanger 134 is intersected with a passageway $120_9$ so as to heat for example a boiler water passing through this passageway 209, thereby generating a high-pressure steam. By the way, a passageway $120_{12}$ for flowing a boiler water for instance is also intersected with the convection portion 113 of the reformer 110 so as to allow the combustion exhaust gas of the convection portion 113 to be heat-exchanged with the aforementioned boiler water, thereby cooling the combustion exhaust gas and at the same time, heating the boiler water to generate a high-pressure steam.

Next, the method of manufacturing a synthesis gas will be explained with reference to the aforementioned synthesizing plant shown in FIG. 13.

First of all, a fuel for combustion is fed via the fuel-introducing passageway $120_3$ to the combustion radiation portion 112 of the reformer 110 so as to allow the fuel to burn together with air, thereby heating the reaction tube 111 up to a sufficiently high temperature (for example, 850 to 900° C.). The combustion exhaust gas containing carbon dioxide and generated at this combustion radiation portion 112 is allowed to flow via the convection portion 113 into the chimney 114. Namely, the combustion exhaust gas is heat-exchanged with the natural gas passing through the raw gas-introducing passageway $120_1$ as well as with the boiler water passing through the passageway $120_{12}$ as the combustion exhaust gas passes through the convection portion 113, thereby cooling the combustion exhaust gas. The carbon dioxide in the combustion exhaust gas that has been cooled in this manner is recovered by the carbon dioxide recovery device 131 and then, transferred via the passageway $120_4$ to the compressor 132. The combustion exhaust gas from which carbon dioxide has been removed is then allowed to be released to air atmosphere through the chimney 114.

Natural gas containing methane as a main component is fed to the raw gas-introducing passageway $120_1$. At this moment, the carbon dioxide that has been pressurized by the compressor 132 is added via the passageway $120_5$ to the natural gas at a predetermined ratio. Further, steam is also added via the steam-introducing passageway $120_2$ to the natural gas at a predetermined ratio. On the occasion of adding these steam and carbon dioxide to the natural gas, the molar ratios of these steam and carbon dioxide to the natural gas should preferably be set such that the ratio between methane ($CH_4$) and stream ($H_2O$) is 1:1.5 to 1:3; while the ratio between methane ($CH_4$) and carbon dioxide ($CO_2$) is 1:0.5 to 1:2. By the way, as for this steam, the steam that has been generated through a heat exchange between the boiler water and the synthesis gas at the heat exchanger 134 as well as the steam that has been generated through a heat exchange between the boiler water and the combustion exhaust gas at the convection portion 113 of reformer 110 can be utilized.

The natural gas mixed with carbon dioxide and steam is allowed to flow inside the raw gas-introducing passageway $120_1$ and heated (preliminarily heated) as the aforementioned mixed natural gas passes through the convection portion 113 of reformer 110. Thereafter, this mixed natural gas is fed to the reaction tube 111. The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO=1$ to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil.

Further, in this synthesizing reaction, a purging gas containing carbon dioxide and unreacted natural gas is caused to generate. This purging gas is then added, via the passageway $120_{24}$, as a carbon dioxide source to the natural gas existing inside the raw gas-introducing passageway $120_1$.

According to this thirteenth Embodiment, the reformer 110 is constituted by the reaction tube 111 and the combustion radiation portion 112 which is designed to heat the reaction tube 111 through a combustion between a fuel and air, thereby enabling the interior of the reaction tube 111 to be heated up to a sufficiently high temperature (for example, 850 to 900° C.) by means of the combustion radiation portion 112 on the occasion of feeding the steam-mixed natural gas via the raw gas-introducing passageway $120_1$ to the reaction tube 111. As a result, it is now possible to allow a reaction to effectively take place between mainly methane in the natural gas and the steam to thereby obtain a reformed gas comprising CO and $H_2$. On this occasion, the combustion exhaust gas discharged from the combustion radiation portion 112 is cooled, and then, the carbon dioxide contained in the combustion exhaust gas is recovered at the carbon dioxide recovery device 131 and transferred to the compressor 132 so as to be compressed by the compressor 132, the resultant compressed carbon dioxide being transferred via the passageway $120_5$ to the raw gas-introducing passageway $120_1$ and added to the natural gas flowing through the raw gas-introducing passageway $120_1$. Additionally, the purging gas containing carbon dioxide that has been generated in the Fisher-Tropsch (FT) reaction system 135 is added via the passageway $120_{24}$ to the natural gas existing inside the raw gas-introducing passageway $120_1$.

By feeding carbon dioxide to the steam-mixed natural gas in this manner, it is possible to allow a reaction between the carbon dioxide and the steam to take place at the reaction tube 111, thus producing CO and $H_2$, and at the same time, an oxygen source can be introduced into the reformed gas. As a result, it is possible to reduce the quantity of hydrogen in the reformed gas with the employment of a reduced quantity of oxygen supply on the occasion of burning hydrogen of the reformed gas using an externally supplied oxygen in the partial oxidation furnace 133 by introducing the reformed gas into the partial oxidation furnace 133, thus making it possible to manufacture a synthesis gas having a molar ratio of $H_2/CO=1$ to 2.5. Further, due to the provision of the partial oxidation furnace 133, the residual methane can be effectively reformed into CO and $H_2$. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Therefore, in the process of manufacturing a synthesis gas having a molar ratio of $H_2/CO$ which is suited for synthesizing gasoline, kerosene and gas oil by way of the Fisher-Tropsch reaction system (the manufacturing process comprising the steps of feeding a steam and carbon dioxide-mixed natural gas to the reformer, introducing a reformed gas from this reformer into the partial oxidation furnace, and feeding oxygen to the partial oxidation furnace to burn the hydrogen contained in the reformed gas), the quantity of oxygen to be supplied to the partial oxidation furnace can be reduced, thereby making it possible to miniaturize the oxygen plant for producing oxygen and hence to suppress an increase in manufacturing cost accompanied with the production of oxygen.

Additionally, since the carbon dioxide generated in the manufacturing plant (the reformer) of synthesis gas which comprises the Fisher-Tropsch (FT) reaction system is recovered, and at the same time, the carbon dioxide in the synthesis gas is recovered, all of the recovered carbon dioxide being subsequently added to the natural gas on the upstream side of the reformer, it is possible to utilize the carbon dioxide as a raw gas for the reformed gas and to minimize or prevent the discharge of carbon dioxide outside the manufacturing plant, which would become a cause for the warm-up of the earth.

Furthermore, since the purging gas containing carbon dioxide that has been generated in the Fisher-Tropsch reaction system 135 is supplied as a carbon dioxide source to the natural gas, it is no more required to install a separate carbon dioxide recovery device for recovering carbon dioxide included in the synthesis gas as required in the case of any of the aforementioned eighth to twelfth Embodiments, thereby making it possible to manufacture the synthesis gas and to synthesize gasoline, kerosene and gas oil by making use of a cheap plant.

Example 10

In this Example 10, the manufacture of a synthesis gas according to the aforementioned thirteenth Embodiment will be specifically explained with reference to FIG. 13.

A fuel (natural gas) was fed to the combustion radiation portion 112 of the reformer 110 at a flow rate of 550 kg·mol/hr and burnt together with air at the combustion radiation portion 112. Further, natural gas, steam and carbon dioxide (which was recovered from the combustion exhaust gas of the reformer 110 and the purging gas generated at the Fisher-Tropsch reaction system 135) were introduced into the raw gas-introducing passageway $120_1$ under the conditions shown in the following Table 10 and then, subjected to steam reforming at the reaction tube 111 of the reformer 110. Further, the resultant reformed gas was introduced into the partial oxidation furnace 133, and at the same time, oxygen was introduced via the oxygen introducing passageway $120_7$ to the partial oxidation furnace 133 under the conditions shown in the following Table 10, thereby manufacturing a synthesis gas. The composition of the synthesis gas thus obtained is shown in the Table 10.

In Table 10, the item (A) represents natural gas to be fed to the raw gas-introducing passageway $120_1$; the item (B) represents steam to be fed to the raw gas-introducing passageway $120_1$; the item (C) represents carbon dioxide which was recovered at the carbon dioxide recovery device 131, the recovered carbon dioxide being subsequently compressed by the compressor 132 before it was transferred to the raw gas-introducing passageway $120_1$; the item (D) represents the purging gas which was generated in the Fisher-Tropsch reaction system 135; the item (E) represents oxygen to be fed to the partial oxidation furnace 133; and the item (F) represents the synthesis gas manufactured at the reformer 110, the synthesis gas being subsequently fed via the heat exchanger 134 to the Fisher-Tropsch reaction system 135. These items (A) to (F) are also shown in FIG. 13.

TABLE 10

| Item | (A) | (B) | (C) | (D) | (E) | (F) |
|---|---|---|---|---|---|---|
| Composition | | | | | | |
| $CH_4$ (mol %) | 94 | — | — | 8.2 | — | 0.1 |
| $C_2H_6$ (mol %) | 6 | — | — | 0.8 | — | — |
| $H_2$ (mol %) | — | — | — | 35.6 | — | 44.5 |
| CO (mol %) | — | — | — | 17.7 | — | 22.2 |
| $CO_2$ (mol %) | — | — | 100 | 37.4 | — | 6.8 |
| $H_2O$ (mol %) | — | 100 | — | — | — | 26.4 |
| $O_2$ (mol %) | — | — | — | — | 99.5 | — |
| $N_2$ (mol %) | — | — | — | 0.3 | 0.5 | — |
| $H_2O$ (mol %) | 100 | 100 | 100 | 100 | 100 | 100 |
| Flow rate(kg · mol/hr) | 1000 | 2296 | 342 | 1290 | 213 | 6818 |
| Temperature (° C.) | 400 | 200 | 150 | 150 | 40 | 40 |
| Pressure (kg/cm²G) | 20 | 20 | 20 | 20 | 20 | 15 |

As seen from Table 10, because of the process wherein not only the steam-mixed carbon dioxide which was recovered at the carbon dioxide recovery device 131 but also the purging gas containing carbon dioxide that has been generated in the Fisher-Tropsch reaction system were added to the steam-mixed natural gas; the resultant natural gas mixture was reformed at the reaction tube 111 of the reformer 110 that has been heated up to a predetermined temperature; and the quantity of supplying oxygen to the partial oxidation furnace 133 was set to 213 kg·mol/hr in flow rate on the occasion of introducing the reformed gas into the partial oxidation furnace 133; it was possible to manufacture a synthesis gas having a molar ratio of $H_2$/CO=about 2. This quantity of oxygen supplied to the partial oxidation furnace 133 corresponds to about a half of the quantity to be employed in the conventional manufacturing method of synthesis gas as disclosed in FIGS. 3 and 4 of Japanese Patent Unexamined Publication No. 6-184559, thus making it possible to greatly reduce the quantity of oxygen to be supplied to the partial oxidation furnace.

(Fourteenth Embodiment)

Figure 14:
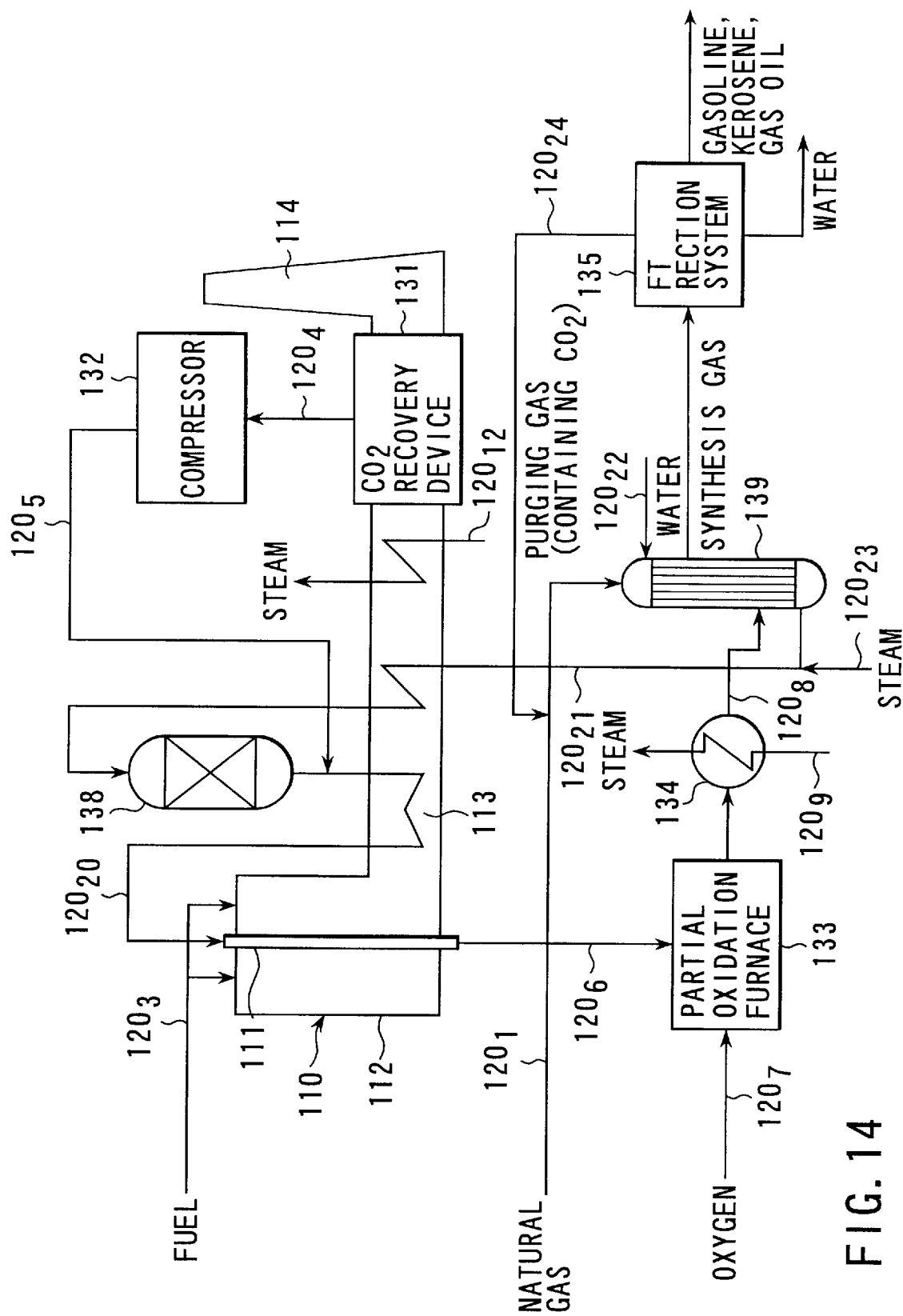
FIG. 14 is a flow chart illustrating main manufacturing steps of synthesis gas in a synthesizing plant of gasoline, kerosene and gas oil, which can be employed according to a fourteenth Embodiment of this invention.

FIG. 14 is a flow chart illustrating main manufacturing steps of synthesis gas in a synthesizing plant of gasoline, kerosene and gas oil, which can be employed according to the fourteenth Embodiment of this invention. In this FIG. 14, the same components as employed in the aforementioned FIG. 13 are identified by the same numbers, thereby omitting the explanation thereof.

This synthesizing plant is featured in that a heat exchange type moistening device 139 is disposed at a midway of the passageway $120_8$ which is located between the heat exchanger 134 and the Fisher-Tropsch reaction system 135, both being disposed on a downstream side of the reformer 110. The raw gas-introducing passageway $120_1$ is communicated with a top portion of the moistening device 139. This moistening device 139 is communicated via the passageway $120_{21}$ with a top portion of the preliminary reformer 138 located on an upstream side of the reformer 110. This preliminary reformer 138 is communicated via the passageway $120_{20}$ with an upper end of the reaction tube 111 of the reformer 110. The passageway $120_{20}$ is communicated via the convection portion 113 of the reformer 110 with the reaction tube 111. The compressor 132 is communicated via the passageway $120_5$ with the passageway $120_{20}$ which is disposed connecting the preliminary reformer 138 with the reformer 110. The Fisher-Tropsch reaction system 135 is communicated via a purging gas-supplying passageway $120_{24}$ with the raw gas-introducing passageway $120_1$.

Next, the method of manufacturing a synthesis gas will be explained with reference to the aforementioned synthesizing plant shown in FIG. 14.

First of all, in the same manner as in the thirteenth Embodiment, a fuel for combustion is fed to the combustion radiation portion 112 of the reformer 110 so as to heat the reaction tube 111 up to a sufficiently high temperature. The carbon dioxide included in the combustion exhaust gas which has been generated at the combustion radiation portion 112 and cooled subsequently is recovered at the carbon dioxide recovery device 131 and then, transferred to the compressor 132.

Natural gas containing methane as a main component is fed via the raw gas-introducing passageway $120_1$ to an top portion of the moistening device 139. water is introduced via the passageway $120_{22}$ into this top portion of the moistening device 139 to moisten the natural gas. Specifically, the natural gas is allowed to contact with water that has been supplied from the passageway $120_{22}$ in the moistening device 139, thus moistening the natural gas with the water, after which the moistened natural gas is heated and additionally moistened through the heat-exchange thereof with a high-temperature synthesis gas that has been supplied via the passageway $120_8$ from the partial oxidation furnace 133.

This moistened natural gas is then fed via the passageway $120_{21}$ to the preliminary reformer 138. On this occasion, steam is supplied to the natural gas flowing through the passageway $120_{21}$ from the passageway $120_{23}$, thereby making up the shortage in quantity of steam. On the occasion of adding steam through the moistening and also through the passageway $120_{23}$ to the carbon dioxide-mixed natural gas, the molar ratio of the steam to the natural gas should preferably be set such that the ratio between methane ($CH_4$) and stream ($H_2O$) is 1:1.5 to 1:3.

Further, this moistened steam-mixed natural gas is allowed to pass through the passageway $120_{21}$ and heated (preliminarily heated) as the natural gas passes through the convection portion 113 of the reformer 110. In the aforementioned preliminary reformer 138, the hydrocarbons of the natural gas which have two or more carbon atoms, mainly ethane, are reformed into methane having one carbon atom, CO and $H_2$.

The steam-mixed natural gas preliminarily reformed in this manner is then fed via the passageway $120_{20}$ to the reaction tube 111 of the reformer 110. On this occasion, the carbon dioxide that has been compressed by the compressor 132 is fed at a predetermined ratio via the passageway $120_5$ to the steam-mixed natural gas reformed preliminarily as mentioned above and flowing through the passageway $120_{20}$.

The mixed gas comprising natural gas containing methane ($CH_4$) as a main component, steam and carbon dioxide, which has been fed to the reaction tube 111 of the reformer 110 is then subjected to steam reforming wherein mainly methane is steam-reformed under the presence of a catalyst filled into the reaction tube 111, thereby converting the mixed gas into a reformed gas containing hydrogen gas, carbon monoxide and carbon dioxide according to the aforementioned formulas (1) and (2).

By the way, since the aforementioned reforming reaction is an endothermic reaction, it is required to burn the fuel gas together with air at the combustion radiation portion 112 of the reformer 110 as mentioned above so as to heat the interior of the reaction tube 111.

The reformed gas thus obtained is fed via the passageway $120_6$ to the partial oxidation furnace 133, in which the hydrogen in the reformed gas is allowed to burn by the oxygen that has been introduced therein from the oxygen introducing passageway $120_7$. On this occasion, since the reformed gas is heated up to a high temperature, CO and $H_2$ are caused to be generated according to the aforementioned reaction formula (1). Further, since the quantity of hydrogen in the reformed gas is caused to decrease in the partial oxidation furnace 133, it becomes possible to manufacture a synthesis gas having a molar ratio of $H_2/CO=1$ to 2.5 through the operation of the partial oxidation furnace 133.

The synthesis gas produced at the partial oxidation furnace 133 is fed via the passageway $120_8$ to heat exchanger 134 to heat the boiler water flowing through the passageway $120_9$, thereby generating a high-pressure steam. Concurrently, the synthesis gas itself is cooled and then, fed to the moistening device 139 so as to be utilized as a heating source for humidifying the carbon dioxide-mixed natural gas. The synthesis gas discharged from the moistening device 139 is sent to the Fisher-Tropsch (FT) reaction system 135 which is filled with a cobalt-based catalyst for instance, thereby allowing the hydrogen and carbon monoxide all included in the synthesis gas to react with each other, thus synthesizing gasoline, kerosene and gas oil. Additionally, in this synthesizing reaction, a purging gas containing carbon dioxide and unreacted natural gas is caused to generate. This purging gas is then added, via the passageway $120_{24}$, as a carbon dioxide source to the natural gas existing inside the raw gas-introducing passageway $120_1$.

According to this fourteenth Embodiment, it is possible to manufacture a synthesis gas comprising Co and $H_2$ at a molar ratio of $H_2/CO=1$ to 2.5 in the same manner as in the case of the thirteenth Embodiment. This synthesis gas having such a molar ratio of $H_2/CO$ is then transferred to the Fisher-Tropsch (FT) reaction system 135 which is filled with a cobalt-based catalyst for instance, thereby allowing the hydrogen and carbon monoxide all included in the synthesis gas to react with each other, thus making it possible to synthesize gasoline, kerosene and gas oil.

Furthermore, since the purging gas containing carbon dioxide that has been generated in the Fisher-Tropsch reaction system 135 is supplied as a carbon dioxide source to the natural gas, it is no more required to install a separate carbon dioxide recovery device for recovering carbon dioxide included in the synthesis gas as required in the case of any of the aforementioned eighth to twelfth Embodiments, thereby making it possible to manufacture the synthesis gas and to synthesize gasoline, kerosene and gas oil by making use of a cheap plant.

Additionally, since the preliminary reformer 138 is disposed on an upstream side of the reformer 110 to thereby make it possible to preliminarily reform the hydrocarbons of the natural gas which have two or more carbon atoms, mainly ethane, into methane having one carbon atom, CO and $H_2$, it is possible to alleviate the thermal load at the reformer 110. As a result, the quantity of fuel to be fed to the combustion radiation portion 112 of the reformer 110 can be reduced, thus making it possible to manufacture a synthesis gas at low cost.

Moreover, since the moistening device 139 is disposed on an downstream side of the reformer 110 so as to moisten the natural gas, it is possible to reduce the quantity of steam to be supplied via the passageway $120_{23}$ to the natural gas. As a result, the quantity of steam to be fed together with the natural gas to the reaction tube 111 of the reformer 110 can be reduced, thus making it possible to manufacture a synthesis gas at a low cost.

By the way, it is possible in this fourteenth Embodiment to omit either the moistening device or the preliminary reformer. In the former case (where the moistening device is omitted), steam is fed to the raw gas-introducing passageway $120_1$ where the natural gas is flowing, and the resultant steam-mixed natural gas is directly supplied via the raw gas-introducing passageway $120_1$ to the preliminary reformer 138. In the latter case (where the preliminary reformer is omitted), carbon dioxide which has been recovered at the carbon dioxide recovery device 131 and then compressed by means of the compressor 132 is fed to the raw gas-introducing passageway $120_1$ where the natural gas is flowing, and the resultant carbon dioxide-mixed natural gas is transferred via the raw gas-introducing passageway $120_1$ to the moistening device 139 to moisten the carbon dioxide-mixed natural gas. However, in either cases, the purging gas containing carbon dioxide that has been generated at the Fisher-Tropsch reaction system 135 is employed as a carbon dioxide source and sent to the raw gas-introducing passageway $120_1$ where the natural gas flows.

Although the reformed gas and oxygen are fed to the partial oxidation furnace in any of the foregoing eighth to fourteenth Embodiments, this oxygen may be replaced by a mixed gas comprising oxygen and carbon dioxide. In this case, the carbon dioxide may preferably be added at a ratio of 10 to 300% by volume based on the volume of oxygen. When this mixed gas is employed in place of the pure oxygen, the reaction inside the partial oxidation furnace between the hydrogen included in the reformed gas and oxygen can be made slower, thereby avoiding the possibility of explosion.

It is also possible to feed steam to the partial oxidation furnace in the foregoing eighth to fourteenth Embodiments. When steam is fed to the partial oxidation furnace, the generation of free carbon in the partial oxidation furnace can be inhibited or prevented.

As explained above, it is possible according to this invention to provide a method for manufacturing a synthesis gas having a molar ratio of $H_2/CO$ which is suited for synthesizing gasoline, kerosene and gas oil by way of the Fisher-Tropsch reaction system, said method making it possible to procure $CO_2$ inside a synthesis gas-manufacturing plant utilizing the Fisher-Tropsch reaction system, thereby enabling the synthesis gas to be cheaply manufactured anywhere without being restricted by the location of $CO_2$ gas source such as an ammonia plant.

Further, it is also possible according to this invention to provide a method of manufacturing a synthesis gas having a molar ratio of $H_2/CO$ which is suited for synthesizing gasoline, kerosene and gas oil by way of the Fisher-Tropsch reaction system, wherein a carbon dioxide-containing natural gas is fed to a reformer and then the resultant reformed gas is introduced from the reformer into the partial oxidation furnace so as to allow hydrogen in the reformed gas to burn through a reaction thereof with oxygen that has been fed to the partial oxidation furnace, thereby making it possible to minimize the quantity of feeding oxygen to the partial oxidation furnace and to miniaturize an oxygen plant for producing oxygen.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a synthesis gas containing CO and $H_2$, which is suited for use in synthesizing gasoline, kerosene and gas oil by way of the Fisher-Tropsch reaction system; the method comprising the steps of;

feeding a steam-mixed natural gas to a reformer which is provided with a combustion radiation portion for burning a fuel, the reformer being designed to be heated by the combustion radiation portion;

recovering carbon dioxide from a combustion exhaust gas generated at the combustion radiation portion; and adding the carbon dioxide to the steam-mixed natural gas at a location on an upstream side of the reformer, thereby allowing a reforming reaction to take place to obtain a synthesis gas comprising CO and $H_2$ at a molar ratio of $H_2/CO=1$ to 2.5, which is suited for use in synthesizing gasoline, kerosene and gas oil.

2. The method according to claim 1, wherein said carbon dioxide is recovered from the synthesis gas produced in the reformer, the carbon dioxide thus recovered being allowed to recirculate in a region on an upstream side of the reformer.

3. The method according to claim 2, wherein the process of recovering carbon dioxide from the synthesis gas is performed by making use of the same absorbent solution as employed in the process of recovering carbon dioxide from the combustion exhaust gas discharged from the reformer.

4. The method according to claim 1, wherein a preliminary reformer is arranged at an upstream of said reformer, the natural gas to which steam has been added is supplied to said reformer via said preliminary reformer, the carbon dioxide recovered from said combustion exhaust is fed to a passageway connecting said reformer and said preliminary reformer.

5. The method according to claim 1, wherein the step of adding the carbon dioxide to the steam-mixed natural gas is performed by arranging a moistening device at a posterior stage of said reformer, introducing a synthesis gas from said reformer into said moistening device, heating said moistening device with waste heat of the synthesis gas, feeding natural gas and water to said moistening device, and adding steam to the natural gas in said moistening device.

6. The method according to claim 1, wherein a preliminary reformer is arranged at an upstream of said reformer, the natural gas to which steam has been added is supplied to said reformer via said preliminary reformer, the carbon dioxide recovered from said combustion exhaust is fed to a passageway connecting said reformer and said preliminary reformer, and the step of adding the carbon dioxide to the steam-mixed natural gas is performed by arranging a moistening device at a posterior stage of said reformer, introducing a synthesis gas from said reformer into said moistening device, heating said moistening device with waste heat of the synthesis gas, feeding natural gas and water to said moistening device, and adding steam to the natural gas in said moistening device.

7. The method according to claim 1, 4, 5 or 6, wherein a purging gas containing carbon dioxide is circulated in a region on an upstream side of the reformer, said purging gas is produced in the Fisher-Tropsch reaction system on the occasion of synthesizing gasoline, kerosene and gas oil by way of the Fisher-Tropsch reaction system by making use of a synthesis gas produced in the reformer.

8. A method of manufacturing a synthesis gas comprising Co and $H_2$, which is suited for use in synthesizing gasoline, kerosene and gas oil by way of the Fisher-Tropsch reaction system; the method comprising the steps of;

feeding a steam-mixed natural gas to a reformer which is provided with a combustion radiation portion for burning a fuel, the reformer being designed to be heated by the combustion radiation portion;

recovering carbon dioxide from a combustion exhaust gas generated at the combustion radiation portion;

adding the carbon dioxide to the steam-mixed natural gas at a location on an upstream side of the reformer, thereby allowing a reforming reaction to take place; and introducing a reformed gas from the reformer into a partial oxidation furnace simultaneous with an introduction of oxygen into the partial oxidation furnace, thereby allowing the reformed gas to react with the oxygen to obtain a synthesis gas comprising Co and $H_2$ at a molar ratio of $H_2/CO=1$ to 2.5, which is suited for use in synthesizing gasoline, kerosene and gas oil.

9. The method according to claim 8, wherein said carbon dioxide is recovered from the synthesis gas produced in the partial oxidation furnace, the carbon dioxide thus recovered being allowed to recirculate in a region on an upstream side of the reformer.

10. The method according to claim 9, wherein the process of recovering carbon dioxide from the synthesis gas is performed by making use of the same absorbent solution as employed in the process of recovering carbon dioxide from the combustion exhaust gas discharged from the combustion radiation portion of said reformer.

11. The method according to claim 8, wherein a preliminary reformer is arranged at an upstream of said reformer, the natural gas to which steam has been added is supplied to said reformer via said preliminary reformer, the carbon dioxide recovered from said combustion exhaust is fed to a passageway connecting said reformer and said preliminary reformer.

12. The method according to claim 8, wherein the step of adding the carbon dioxide to the steam-mixed natural gas is performed by arranging a moistening device at a posterior stage of said reformer, introducing a synthesis gas from said reformer into said moistening device, heating said moistening device with waste heat of the synthesis gas, feeding natural gas and water to said moistening device, and adding steam to the natural gas in said moistening device.

13. The method according to claim 8, wherein a preliminary reformer is arranged at an upstream of said reformer, the natural gas to which steam has been added is supplied to said reformer via said preliminary reformer, the carbon dioxide recovered from said combustion exhaust is fed to a passageway connecting said reformer and said preliminary reformer, and the step of adding the carbon dioxide to the steam-mixed natural gas is performed by arranging a moistening device at a posterior stage of said reformer, introducing a synthesis gas from said reformer into said moistening device, heating said moistening device with waste heat of the synthesis gas, feeding natural gas and water to said moistening device, and adding steam to the natural gas in said moistening device.

14. The method according to claim 8, 11, 12 or 13, wherein a purging gas containing carbon dioxide is circulated in a region on an upstream side of the reformer, said purging gas is produced in the Fisher-Tropsch reaction system on the occasion of synthesizing gasoline, kerosene and gas oil by way of the Fisher-Tropsch reaction system by making use of a synthesis gas produced in the partial oxidation furnace.

15. The method of manufacturing a synthesis gas according to claim 8, wherein a carbon dioxide-mixed oxygen is fed to the partial oxidation furnace.

* * * * *